United States Patent
Yamamoto et al.

(10) Patent No.: US 9,154,006 B2
(45) Date of Patent: Oct. 6, 2015

(54) ROTOR FOR ROTATING ELECTRIC MACHINE

(75) Inventors: Yoshihisa Yamamoto, Anjo (JP); Yukinori Nakamori, Anjo (JP); Satoshi Murakami, Nishio (JP); Yoichi Miyoshi, Okazaki (JP); Meio Gi, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 390 days.

(21) Appl. No.: 13/519,543

(22) PCT Filed: Sep. 29, 2010

(86) PCT No.: PCT/JP2010/066911
§ 371 (c)(1),
(2), (4) Date: Jun. 27, 2012

(87) PCT Pub. No.: WO2011/118062
PCT Pub. Date: Sep. 29, 2011

(65) Prior Publication Data
US 2012/0299404 A1 Nov. 29, 2012

(30) Foreign Application Priority Data
Mar. 24, 2010 (JP) .................. 2010-068756

(51) Int. Cl.
*H02K 9/19* (2006.01)
*H02K 1/32* (2006.01)
*H02K 1/27* (2006.01)
*H02K 1/28* (2006.01)

(52) U.S. Cl.
CPC ............ *H02K 1/2766* (2013.01); *H02K 1/28* (2013.01); *H02K 1/32* (2013.01); *H02K 9/19* (2013.01)

(58) Field of Classification Search
CPC .................. H02K 9/19; H02K 1/32
USPC ................ 310/52, 54, 58, 59, 61
See application file for complete search history.

(56) References Cited

U.S. PATENT DOCUMENTS

| 5,130,585 A | 7/1992 | Iwamatsu et al. |
| 6,492,742 B1 | 12/2002 | Fujikawa et al. |

(Continued)

FOREIGN PATENT DOCUMENTS

| CN | 101755376 A | 6/2010 |
| JP | A-52-108511 | 9/1977 |

(Continued)

OTHER PUBLICATIONS

Dec. 7, 2010 International Search Report issued in Application No. PCT/JP2010/066911 (with English translation).

*Primary Examiner* — Thomas Truong
(74) *Attorney, Agent, or Firm* — Oliff PLC

(57) ABSTRACT

In a rotor for the dynamo, the interior circumference face of a rotor core main body makes contact in a thermally transmissible manner with a rotor axle, and the rotor axle includes a cooling medium circulation space. The rotor is provided with a cooling medium supply member, which supplies the cooling medium to the cooling medium circulation space. The cooling medium supply member is provided with a cooling medium supply path that extends in the rotor axle direction, and cooling medium supply holes that extend externally in the direction of the rotor diameter. The cooling medium supply holes are provided with supply apertures that open toward the cooling interior circumference face. The rotor axle is provided with cooling medium discharge holes that extend externally in the direction of the rotor diameter. The cooling medium discharge holes are provided with discharge apertures that open externally in the diameter direction.

21 Claims, 14 Drawing Sheets

(56) References Cited

U.S. PATENT DOCUMENTS

| | | | |
|---|---|---|---|
| 8,242,645 B2 | 8/2012 | Tatematsu et al. | |
| 2004/0145246 A1 | 7/2004 | Nakano et al. | |
| 2010/0141062 A1* | 6/2010 | Chamberlin et al. | 310/54 |

FOREIGN PATENT DOCUMENTS

| | | |
|---|---|---|
| JP | A-02-143103 | 6/1990 |
| JP | A-02-231939 | 9/1990 |
| JP | A-05-053846 | 3/1993 |
| JP | A-09-182375 | 7/1997 |
| JP | A-2001-113970 | 4/2001 |
| JP | A-2004-68982 | 3/2004 |
| JP | A-2004-72945 | 3/2004 |
| JP | A-2004-208463 | 7/2004 |
| JP | A-2004-353780 | 12/2004 |
| JP | A-2006-25545 | 1/2006 |
| JP | A-2007-1487 | 1/2007 |

* cited by examiner

ROTOR FOR ROTATING ELECTRIC MACHINE

INCORPORATION BY REFERENCE

The disclosure of Japanese Patent Application No. 2010-068756 filed on Mar. 24, 2010 including the specification, drawings and abstract is incorporated herein by reference in its entirety.

BACKGROUND OF THE INVENTION

The present invention relates to a rotor for a rotating electric machine that has a cylindrical rotor core and a rotor shaft fixed so as to rotate together with the rotor core.

DESCRIPTION OF THE RELATED ART

Rotating electric machines have been used in the past as a source of power for driving various types of equipment. A known rotating electric machine includes a stator having a coil, and a rotor having a permanent magnet. However, equipment driven by a rotating electric machine often requires a large output from the rotating electric machine, which increases the amount of heat generated by various components of the rotating electric machine, especially by the coil and the permanent magnet. Copper loss and iron loss are among the causes behind such heat generation.

A copper loss constantly occurs when a current flows through the coil regardless of the magnitude of the current, and increases with the square of the current flowing through the coil. An iron loss consists of a hysteresis loss and an eddy current loss, and occurs when a magnetic material is exposed to an alternating magnetic field. A hysteresis loss occurs when a magnetic domain of an iron core has the direction of its magnetic field changed by an alternating magnetic field, while an eddy current loss is caused by an eddy current that is generated when a magnetic flux changes inside a conductor. The coil and the permanent magnet of the rotating electric machine generate heat because these losses are radiated as thermal energy, i.e., Joule heat.

If such heat generation becomes excessive, the rotating electric machine experiences a reduction in rotation efficiency due to demagnetization of the permanent magnet and the like, and eventually ceases to function as a rotating electric machine. To counter this problem, there is a rotating electric machine that includes cooling means capable of suitably cooling the permanent magnet and the coil provided in the rotating electric machine. Japanese Patent Application Publication No. JP-A-H09-182375 cited below, for example, describes this type of cooling means.

A cooling circuit of a motor described in JP-A-H09-182375 is used to cool a motor configured to include a rotor having a rotor shaft and a core (that corresponds to a "rotor core" of the present application), and a stator. The cooling circuit is configured to include an axial oil path formed in an axial center portion of the rotor shaft (referred to as a "rotor shaft axial oil path" below), and an axial oil path that passes through the core in the axial direction of the rotor (referred to as a "core axial oil path" below). A cooling medium is supplied to the rotor shaft axial oil path, and the cooling medium flows along the circumferential face of the rotor shaft axial oil path due to the centrifugal force generated by the rotation of the rotor shaft. The cooling medium is also supplied to and flows through the core axial oil path from the rotor shaft axial oil path. This cools a permanent magnet provided in the axial direction of the core. In addition, the cooling medium that flowed through the core axial oil path is discharged from an oil hole of a plate, which is provided at an end portion of the core in the axial direction of the rotor, to a coil end of the stator due to the centrifugal force generated by the rotation of the rotor shaft. Consequently, the coil is cooled.

SUMMARY OF THE INVENTION

According to the art described in JP-A-H09-182375, oil holes are intermittently provided in the circumferential direction of the plate, and formed passing through the plate in the thickness direction. Therefore, a radial moving distance required for the cooling medium to move from the rotor shaft axial oil path to the oil hole is long. This makes the rotor susceptible to the rotary reaction force from the cooling medium, and causes a reduction in the rotation efficiency of the rotor. Further, according to the art described in JP-A-H09-182375, because the cooling medium is made to flow in the core axial oil path, any cooling medium leaking from between laminated steel plates forming the core penetrates into a gap between the outer circumferential face of the rotor and the inner circumferential face of the stator, and the cooling medium may act as a drag on the rotation force of the rotating rotor. In such case, the rotation loss produced by the rotation of the rotor increases and causes a reduction in the rotation efficiency of the motor. For this reason, a structure should be adopted to prevent the cooling medium from leaking out from between the laminated steel plates. However, adopting such a structure would contribute to an increase in the manufacturing and material costs of the rotor.

In light of the foregoing problem, the present invention provides a rotor for a rotating electric machine that is capable of cooling a permanent magnet while decreasing the rotary reaction force of a cooling medium that is caused by the rotation of the rotor.

According to a first aspect of the present invention for achieving the above, a rotor for a rotating electric machine includes a cylindrical rotor core and a rotor shaft fixed so as to rotate together with the rotor core. An inner circumferential face of the rotor core is in heat-transferable contact with the rotor shaft. The rotor shaft is shaped as a cylinder that includes therein a cooling medium flow space through which a cooling medium flows, and an inner circumferential face thereof that faces the cooling medium flow space is a cooling inner circumferential face. A cooling medium supply member that supplies the cooling medium to the cooling medium flow space is provided disposed in the cooling medium flow space. The cooling medium supply member includes therein a cooling medium supply path that extends in a rotor axial direction, and includes a cooling medium supply hole that extends from the cooling medium supply path toward a rotor radial outer side. The cooling medium supply hole includes a supply opening portion that opens toward the cooling inner circumferential face within a region that overlaps with the rotor core in the rotor axial direction. The rotor shaft includes a cooling medium discharge hole that extends from the cooling medium flow space toward the rotor radial outer side. The cooling medium discharge hole includes a discharge opening portion that is more toward a rotor axial outer side than an axial end face of the rotor core and opens toward the radial outer side.

According to the first aspect, the centrifugal force generated in accordance with the rotation of the rotor for a rotating electric machine is utilized to discharge the cooling medium from the cooling medium discharge hole that is provided on the outer side of the cooling medium flow space in the rotor axial direction. The cooling medium can consequently flow along the cooling inner circumferential face of the cooling medium flow space formed inside the rotor shaft, toward the cooling medium discharge hole. The inner circumferential face of the rotor core is in heat-transferable contact with the rotor shaft that has the cooling inner circumferential face. Therefore, the rotor core can be cooled from the inner circumferential face side. Because a structure is achieved in which the rotor core is cooled by making the cooling medium flow inside the rotor shaft as described above, there is no need for a structure that prevents cooling medium leakage as in the case of a configuration in which the cooling medium flows inside the cylindrical rotor core. Thus, the rotor for a rotating electric machine can be inexpensively formed. In addition, the discharge opening portion that opens toward the radial outer side from the cooling medium flow space is provided farther outward in the rotor axial direction than the axial end face of the rotor core. Therefore, the cooling medium can be moved along the cooling inner circumferential face. As a consequence, the inner circumferential face of the rotor core can be suitably cooled. Thus, if a permanent magnet is provided in the rotor core, the permanent magnet can also be suitably cooled. Further, the discharge opening portion that discharges the cooling medium from the cooling medium flow space is provided facing toward the rotor radial outer side from the cooling medium flow space. Therefore, the cooling medium is in effect discharged from the rotor shaft. For this reason, less energy is applied to the cooling medium to discharge the cooling medium compared to a case in which the cooling medium is discharged from the rotor core, and the rotary reaction force from the cooling medium can thus be reduced. Because this lowers the consumption of kinetic energy related to the rotation of the rotor core, the rotation efficiency of the rotor for a rotating electric machine can be increased.

According to a second aspect of the present invention, the inner circumferential face of the rotor core may be in heat-transferable contact with an outer circumferential face of the rotor shaft over a whole axial area.

According to the second aspect, the entire axial area of the inner circumferential face of the rotor core is in heat-transferable contact with the rotor shaft that has the cooling inner circumferential face. Therefore, a cooling effect from the inner circumferential face side of the rotor core can be increased. In addition, the discharge opening portion that opens toward the radial outer side from the cooling medium flow space is provided farther outward in the rotor axial direction than the axial end face of the rotor core. Therefore, the cooling medium can be moved along the cooling inner circumferential face that corresponds to the whole axial area of the inner circumferential face of the rotor core. As a consequence, the inner circumferential face of the rotor core can be suitably cooled over a whole axial area.

According to a third aspect of the present invention, the rotor core may include a rotor core body, and an end plate that is mounted to an axial end face of the rotor core body. A flange-like axial positioning portion may be provided fixed to the rotor shaft, and position the rotor core in an axial direction by contacting an end face of the end plate in the rotor axial direction. A radial groove may be provided formed on at least one of the end plate and the axial positioning portion so as to extend in a rotor radial direction along faces of contact between the end plate and the axial positioning portion. The radial groove may be provided on a radial outer side of the discharge opening portion in communication with the discharge opening portion.

According to the third aspect, the cooling medium discharged from the discharge opening portion can be discharged to the rotor radial outer side through the radial groove. In addition, because the radial groove is formed along the faces of contact between the end plate and the axial positioning portion, the radial groove can be easily shaped. Thus, manufacturing costs can be reduced.

According to a fourth aspect of the present invention, the rotor shaft may include a groove portion that is formed extending in the rotor axial direction on the outer circumferential face thereof; and a flange-like axial positioning portion that is provided so as to position the rotor core in the axial direction, and formed with a cutout portion by cutting out a radial outer portion of the groove portion. The discharge opening portion may be provided in a bottom portion of the groove portion within the cutout portion.

According to the fourth aspect, because the discharge opening portion is provided in the bottom portion of the groove portion and the cutout portion is formed in the radial outer portion of the groove portion, the radial length of the cooling medium discharge hole that has the discharge opening portion can be shortened. The cooling medium discharge hole can thus be easily shaped, which reduces manufacturing costs. Further, because the cutout portion is formed in the radial outer portion of the groove portion, the cooling medium discharged from the discharge opening portion is supplied to the radial outer side without interference from the axial positioning portion.

According to a fifth aspect of the present invention, the cutout portion may also be formed such that its circumferential length increases radially outward.

According to the fifth aspect, even when the rotation speed of the rotor changes, interference by the axial positioning portion with respect to the cooling medium discharged from the discharge opening portion can be suppressed. A cutout portion shaped as a fan when viewed from the rotor axial direction can be formed. Thus, the cooling medium discharged from the discharge opening portion in accordance with the rotation of the rotor shaft can be prevented from flowing along the axial positioning portion. Therefore, the rotary reaction force from the cooling medium can be reduced. Because this lowers the consumption of kinetic energy related to the rotation of the rotor core, the rotation efficiency of the rotor for a rotating electric machine can be increased.

According to a sixth aspect of the present invention, the rotor core may include a rotor core body, and an end plate that is mounted to the axial end face of the rotor core body. A flange-like axial positioning portion may be provided fixed to the outer circumferential face of the rotor shaft, and position the rotor core in the axial direction by contacting the end face of the end plate in the rotor axial direction. The cooling medium discharge hole may be configured including an axial groove that is formed on the outer circumferential face of the rotor shaft so as to extend in the rotor axial direction along faces of contact between an inner circumferential face of the axial positioning portion and the outer circumferential face of the rotor shaft. The axial groove may extend from the axial positioning portion to the rotor axial outer side, and an end portion of the axial groove on the rotor axial outer side may be provided with the discharge opening portion.

According to the sixth aspect, the axial groove formed in the outer circumferential face of the rotor shaft can be utilized as the cooling medium discharge hole. Therefore, the cooling medium discharge hole can be easily formed. Thus, the manufacturing cost of the cooling medium discharge hole can be reduced. In addition, the axial groove is provided extending from the axial positioning portion to the rotor axial outer side, and the end portion of the axial groove on the rotor axial outer side is the discharge opening portion. Therefore, the cooling medium can be discharged farther outward in the rotor axial direction than the axial positioning portion. Thus, the cooling medium discharged from the discharge opening portion in accordance with the rotation of the rotor shaft can be prevented from flowing along the rotor core. Therefore, the rotary reaction force from the cooling medium can be reduced. Because this lowers the consumption of kinetic energy related to the rotation of the rotor core, the rotation efficiency of the rotor for a rotating electric machine can be increased.

According to a seventh aspect of the present invention, the rotor shaft may include the flange-like axial positioning portion that positions the rotor core in the axial direction, and the cooling medium discharge hole may be provided in the axial positioning portion.

According to the seventh aspect, the flange-like axial positioning portion that positions the rotor core with respect to the rotor shaft can be utilized to provide the cooling medium discharge hole close to the axial end face of the rotor core. Therefore, compared to when the cooling medium discharge hole is provided at a position shifted in the axial direction with respect to the flange-like axial positioning portion, the rotor shaft can have a shorter axial length. Further, by providing the cooling medium discharge hole close to the axial end face of the rotor core, a cooling medium discharge route close to the axial end face of the rotor core can also be achieved. A large space that does not interfere with the cooling medium discharge route can thus be secured. Therefore, this space can be utilized to also provide measurement equipment such as a resolver.

According to an eighth aspect of the present invention, the cooling medium flow space may include, at both end portions of the cooling medium flow space in the rotor axial direction, a cooling medium storage portion that expands outward in the rotor radial direction and can store the cooling medium. The cooling medium discharge hole may be formed so as to extend from the cooling medium storage portion toward the rotor radial outer side.

According to the eighth aspect, the cooling medium that moves along the cooling inner circumferential face to the rotor axial outer side can be stored in the cooling medium storage portion that is formed expanding outward (formed increasing in diameter) in the rotor radial direction. Therefore, the cooling medium that moved to the rotor axial outer side can be discharged to the rotor radial outer side after being temporarily stored in both end portions of the cooling medium flow space in the rotor axial direction, and cooling medium leakage along the rotor axial direction to the outer side of the cooling medium flow space can be prevented.

According to a ninth aspect of the present invention, the cooling medium flow space may be defined by an end wall portion that faces a rotor axial center side, and is respectively provided at both end portions of the cooling medium flow space in the rotor axial direction.

According to the ninth aspect, it is possible to stop at the end wall portion the flow of cooling medium that moved toward the rotor axial outer side after being supplied from the cooling medium supply hole to the cooling medium flow space. Therefore, the leakage of cooling medium to the axial outer side to farther outward in the axial direction than the cooling inner circumferential face of the rotor shaft which is provided parallel to the flow of cooling medium along the rotor axial direction can be suitably prevented.

According to a tenth aspect of the present invention, the end wall portion may be configured by a stepped portion of the inner circumferential face of the rotor shaft, with the stepped portion formed such that a center side of the end wall portion in the rotor axial direction is farther outward in the radial direction than an outer side of the end wall portion in the rotor axial direction.

According to the tenth aspect, the end wall portion can be formed by shaping the inner circumferential face of the rotor shaft. Because there is no need to use a new member, the end wall portion can be formed at a low cost. Thus, the rotor for a rotating electric machine can be achieved at a low cost.

According to an eleventh aspect of the present invention, the cooling medium supply member may have a rotation speed difference with respect to the rotor shaft.

According to the eleventh aspect, the supply opening portion formed on the cooling medium supply member does not face only a specific location of the cooling inner circumferential face in the circumferential direction, and coolant is distributed over the whole circumference of the cooling inner circumferential face. Thus, the cooling inner circumferential face can be uniformly cooled.

According to a twelfth aspect of the present invention, the cooling medium supply member may be a penetrating shaft that is disposed so as to pass through the cooling medium flow space.

According to the twelfth aspect, the cooling medium supply member can be supported at both end portions thereof in the rotor axial direction. There is thus no need to form the cooling medium supply member using a material with high bending strength. Therefore, the cooling medium supply member can be formed using an inexpensive material. Thus, the rotor for a rotating electric machine can be achieved at a low cost.

According to a thirteenth aspect of the present invention, the supply opening portion may be disposed at a center portion of the rotor core in the rotor axial direction.

According to the thirteenth aspect, the center portion of the rotor core most susceptible to heat buildup can be intensively cooled. Further, coolant supplied from the supply opening portion to the cooling medium flow space moves along the cooling inner circumferential face toward the cooling medium discharge hole on both end sides in the rotor axial direction, whereby the inner circumferential face of the rotor core can be suitably cooled over a whole axial area. Thus, the permanent magnet provided in the rotor core can be suitably cooled.

According to a fourteenth aspect of the present invention, the supply opening portion may be shifted upward along the rotor axial direction from the center portion of the rotor core in the rotor axial direction in accordance with an inclination angle of the rotor shaft with respect to a horizontal direction.

According to the fourteenth aspect, even if the rotor shaft is not disposed horizontal, by providing the supply opening portion shifted upward from the center portion of the rotor core in the rotor axial direction, the cooling medium supplied from the supply opening portion can be supplied over the whole area of the cooling inner circumferential face. Therefore, the permanent magnet can be suitably cooled.

DETAILED DESCRIPTION OF THE EMBODIMENTS

1. First Embodiment

Hereinafter, a rotor R for a rotating electric machine (referred to as a "rotor R" below) according to the present invention will be described. As described in detail later, the present rotor R is configured to enable a coolant (that corresponds to a "cooling medium" of the present invention) to cool a permanent magnet PM provided in the rotor R, while reducing the rotary reaction force that the coolant applies to the rotor R. It should be noted that, although a common cooling oil is preferably used as the coolant, the coolant is not limited to this.

Figure 1:
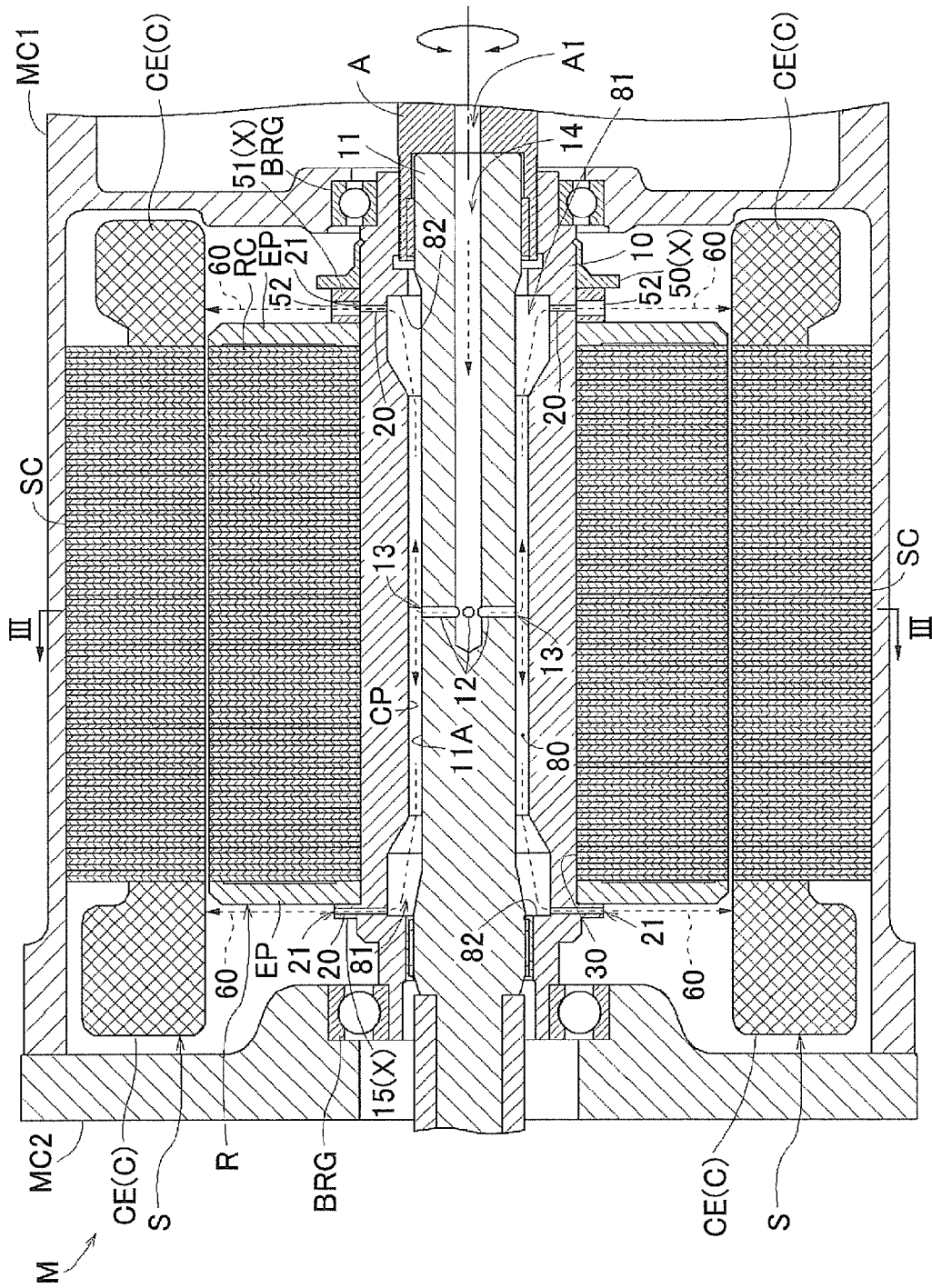
FIG. 1 is a view that shows a side cross section of a rotating electric machine according to a first embodiment.

FIG. 1 is a side cross-sectional view of a rotating electric machine M that is provided with the rotor R according to the present embodiment. As shown in FIG. 1, the rotating electric machine M is constituted such that a stator S and the rotor R are accommodated inside a space that is formed by a case body MC1 and a cover MC2 that covers an opening portion of the case body MC1. The stator S is fixed to the case body MC1. Note that the case body MC1 and the cover MC2 correspond to a case that accommodates the rotating electric machine M. Therefore, in the following description, the case body MC1 and the cover MC2 will both be referred to as the cases MC1, MC2 when there is no need to distinguish between the case body MC1 and the cover MC2.

The rotating electric machine M may output the driving force (rotary force) generated by the rotating electric machine M to outside the rotating electric machine M. In such case, the rotating electric machine M functions as an electric motor. By transmitting a driving force (rotary force) to the rotating electric machine M from outside, the rotating electric machine M may also function as a generator that generates power. The present embodiment will be described using an example in which the rotating electric machine M functions as an electric motor.

Figure 2:
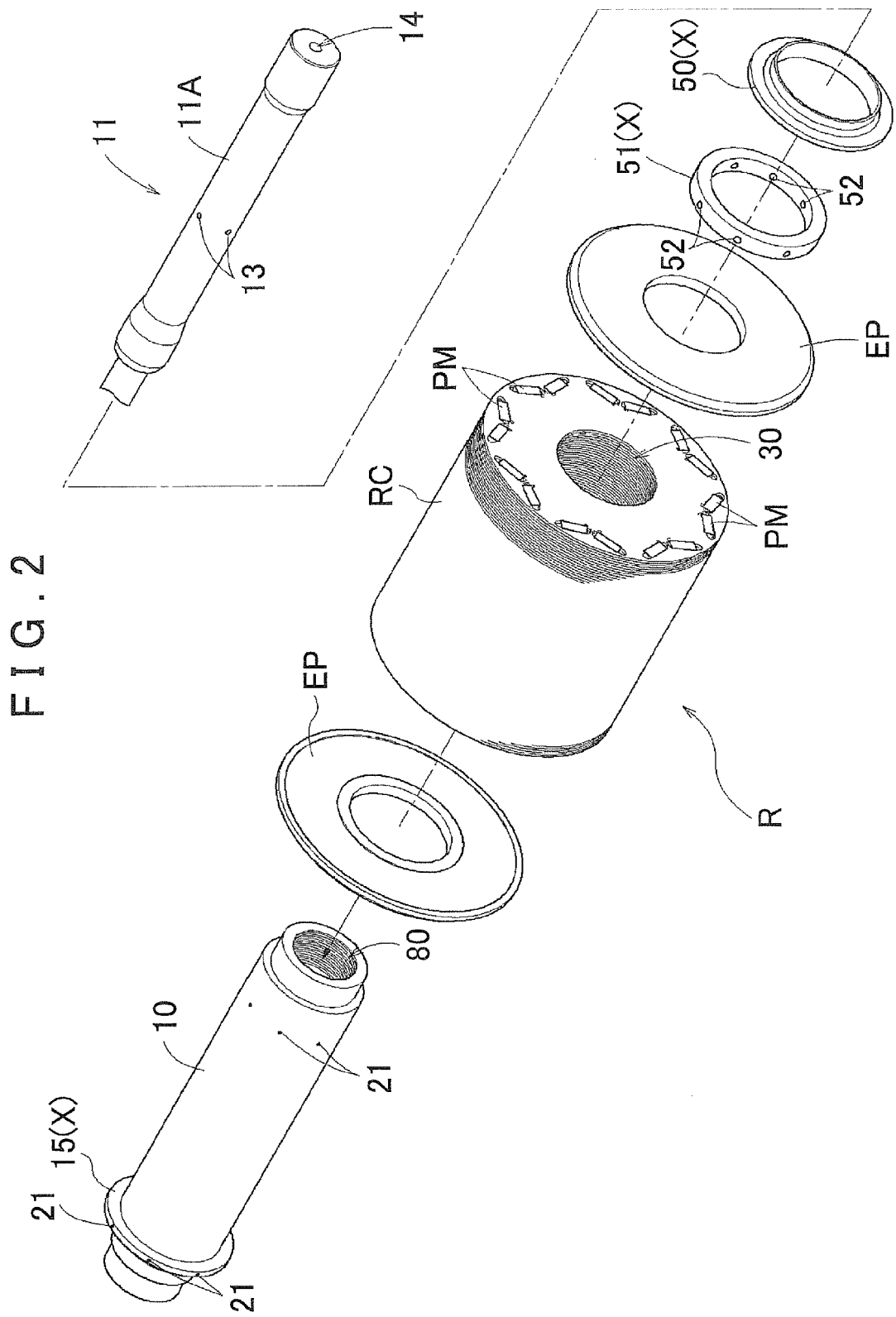
FIG. 2 is an exploded perspective view of a rotor according to the first embodiment.

The rotating electric machine M functioning as an electric motor acquires rotary power through the electromagnetic action of a coil C and a permanent magnet PM (see FIG. 2). Acquisition of such rotary power is a known art and will not be described further here. In the present embodiment, the coil C is provided in the stator 5, and the permanent magnet PM is provided in the rotor R.

Figure 3:
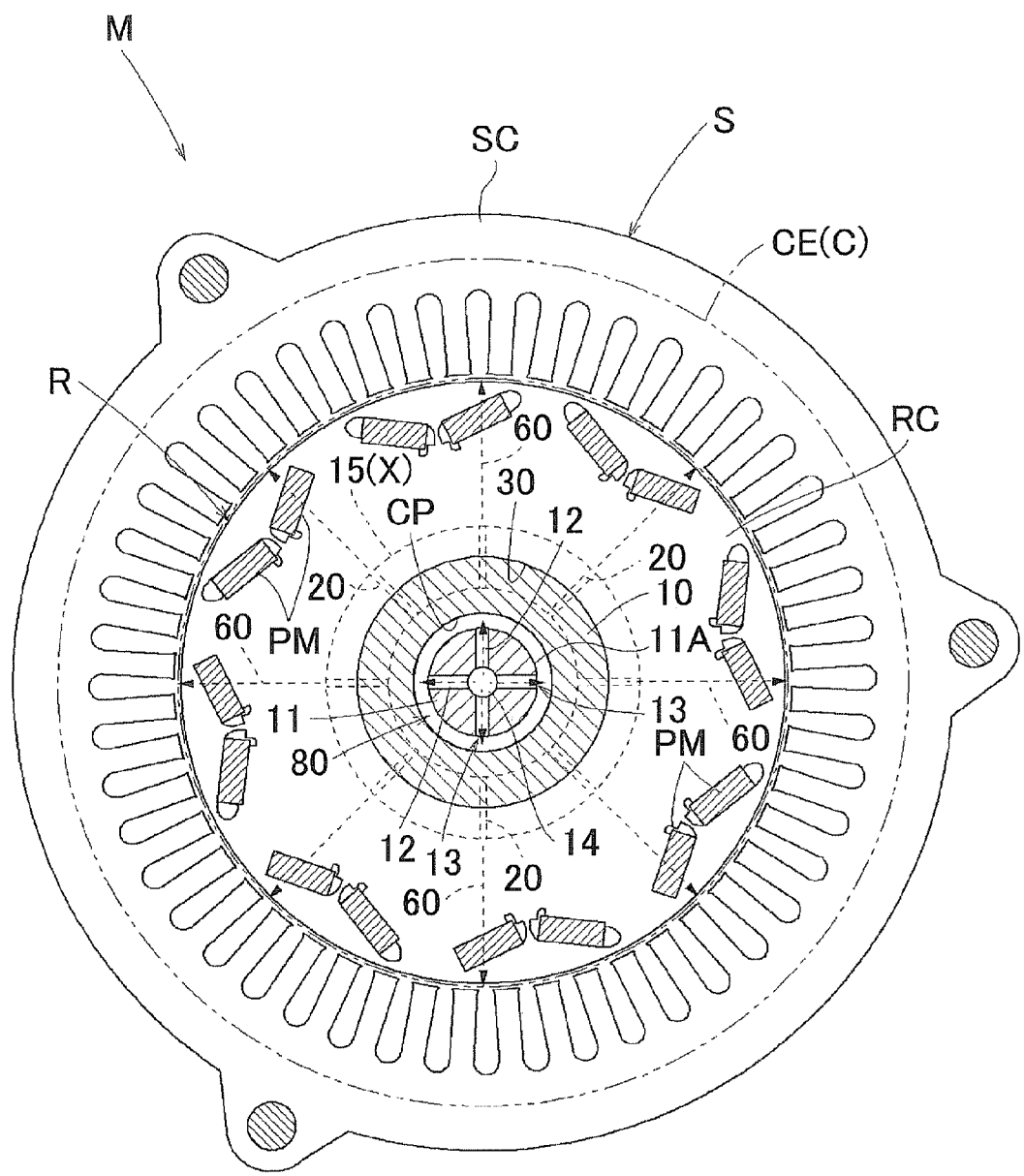
FIG. 3 is a view that shows a cross section taken along a line in FIG. 1.

FIG. 2 shows an exploded perspective view of the rotor R, and FIG. 3 shows a cross-sectional view taken along a line III-III in FIG. 1. The present rotor R is configured to include a rotor core body RC, a rotor shaft 10, a cooling inner circumferential face CP, and a cooling medium supply member 11. As shown in FIGS. 1 to 3, the rotor R is configured with a cylindrical rotor core body RC. The rotor core body RC is formed by laminating a plurality of members having an annular plate shape. The annular plate shape corresponds to a ring-shaped (donut-shaped) plate whose outer circumference is circular, and whose central portion is replaced by a circular opening that is concentric with and smaller than the circular outer circumference. The member having an annular plate shape is formed by punching (blanking) a core material (steel plate) of a predetermined thickness (e.g., several millimeters) into this ring shape. The rotor core body RC is formed by laminating a plurality of members having the same annular plate shape formed by such blanking so that the respective axial centers thereof coincide. Accordingly, the rotor core body RC is formed into a cylindrical shape whose radial central portion has a through hole 30 that runs along the rotor axial direction.

The through hole 30 of the rotor core body RC is fitted with the rotor shaft 10 in a penetrating state. Fitting of the rotor shaft 10 in the through hole 30 can be achieved using a "loose fit" in which the rotor shaft 10 is fitted to the through hole 30 formed with an inner diameter that is larger than the outer diameter of the rotor shaft 10 on the order of several tens of micrometers, or using an "interference fit" in which the rotor shaft 10 is fitted to the through hole 30 formed with an inner diameter that is smaller than the outer diameter of the rotor shaft 10 on the order of several tens of micrometers. For an interference fit, a warm fit can be used in which fitting is performed with the rotor core body RC superheated and expanded, for example.

Accordingly, the inner circumferential face of the rotor core body RC is in heat-transferable contact with the outer circumferential face of the rotor shaft 10 over a whole axial area. Here, the whole axial area of the rotor core body RC is a whole region along the rotor axial direction of the inner circumferential face of the through hole 30 in the rotor core body RC. It should be noted that the inventors of the present application have confirmed that the same level of cooling effect of the permanent magnet PM, which is an object of the present application, is achieved even with the use of a loose fit or an interference fit as described above. In addition, an end plate EP is mounted to each axial end face of the rotor core body RC, and the rotor shaft 10 passes through both the rotor core body RC and the end plate EP. The rotor shaft 10 passing through the through hole 30 of the rotor core body RC and the end plate EP is fixed so as to rotate together with the end plate EP and the rotor core body RC. Therefore, the "rotor core" of the present invention includes both the end plate EP and the rotor core body RC.

An internal portion of the rotor shaft 10 is formed into a cylindrical shape that includes a cooling medium flow space 80 through which coolant flows, and the inner circumferential face of the rotor shaft 10 that faces the cooling medium flow space 80 is the cooling inner circumferential face CP. The above internal portion is a radial center portion of the rotor shaft 10. Accordingly, the rotor shaft 10 has a cylindrical shape, with the cooling medium flow space 80 formed in the radial center portion of the rotor shaft 10 and extending in the axial direction. The inner circumferential face facing the cooling medium flow space 80 is an exposed inner face of the rotor shaft 10 formed into a cylindrical shape, and the inner circumferential face corresponds to the cooling inner circumferential face CP.

In particular, the cooling inner circumferential face CP according to the present embodiment is exposed over a whole area in the rotor circumferential direction of the inner circumferential face of the rotor shaft 10 as shown in FIG. 3. Therefore, coolant supplied to the cooling medium flow space 80 as will be described later is susceptible to relative motion in the circumferential direction in accordance with the rotation of the rotor R. Thus, inertia when the rotation speed of the rotor R changes can lessen the rotary reaction force the rotor R receives from the coolant. Accordingly, the kinetic energy used by the rotating electric machine M to rotate the coolant can be kept small, which makes it possible to increase the energy efficiency of the rotating electric machine M.

The cooling medium supply member 11 is disposed in the cooling medium flow space 80 and supplies coolant to the cooling medium flow space 80. As described above, the radial center portion of the rotor shaft 10 is formed with the cooling medium flow space 80 along the rotor axial direction, and the inner circumferential face thereof is the cooling inner circumferential face CP. The cooling medium supply member 11 is disposed separate from the cooling inner circumferential face CP, such that an outer circumferential face 11A of the cooling medium supply member 11 does not contact the cooling inner circumferential face CP. In the present embodiment, the cooling medium supply member 11 is formed with an outer diameter that is smaller than the inner diameter of the cooling medium flow space 80, and constituted as a penetrating shaft that is disposed so as to pass through the cooling medium flow space 80 along the rotor axial direction.

In addition, the cooling medium supply member 11 described above is provided with the outer circumferential face 11A thereof separate from the cooling inner circumferential face CP. Thus, the cooling medium flow space 80 is the gap formed between the outer circumferential face 11A of the cooling medium supply member 11 and the cooling inner circumferential face CP. Accordingly, by supplying coolant to the cooling medium flow space 80 and rotating the rotor R, the centrifugal force generated by such rotation can be utilized to make coolant flow along the cooling inner circumferential face CP.

The cooling medium supply member 11 also has therein a cooling medium supply path 14 that extends in the rotor axial direction. Extending in the rotor axial direction means that the cooling medium supply path 14 is formed along the rotor axial direction on the radial inner side of the cooling medium supply member 11. The cooling medium supply path 14 communicates with a cooling medium flow path A1, described later, that is formed in the axial central portion of a rotation shaft A, and coolant is supplied from the cooling medium flow path A1.

The rotation shaft A is rotatably supported by the case body MC1 and the case MC2 through a support bearing BRG that can rotate together with the rotor core body RC. The axial central portion of the rotation shaft A is formed with the cooling medium flow path A1. The cooling medium flow path A1 is supplied with coolant through the discharge pressure of a pump not shown in the drawings, or the like. Thus, coolant can be supplied to the cooling medium supply path 14 that is communicatively connected to the cooling medium flow path A1.

The cooling medium supply member 11 also has a cooling medium supply hole 12 that extends in the rotor radial direction from the cooling medium supply path 14. Extending in the rotor radial direction means that the cooling medium supply hole 12 is formed extending toward the radial outer side from the cooling medium supply path 14, which is formed on the radial inner side of the cooling medium supply member 11. In addition, the cooling medium supply hole 12 has a supply opening portion 13 that opens toward the cooling inner circumferential face CP within a region that overlaps with the rotor core body RC in the rotor axial direction. A region that overlaps with the rotor core body RC in the rotor axial direction is a region along the rotor axial direction where the inner circumferential face of the rotor core body RC is in contact with the outer circumferential face of the rotor shaft 10. The supply opening portion 13 is provided on the outer circumferential face of the cooling medium supply member 11 within this region. Accordingly, the cooling medium supply hole 12 functions as a communication hole that communicates the cooling medium supply path 14 with the cooling medium flow space 80.

The cooling medium supply hole 12 and the supply opening portion 13 are each formed in a plurality along the circumferential direction as viewed from the rotor axial direction. For example, as shown in FIG. 3, the cooling medium supply hole 12 and the supply opening portion 13 can be formed at 90-degree intervals in the circumferential direction as viewed from the rotor axial direction, and obviously can be formed at other degree intervals as well. Due to the centrifugal force generated by the rotation of the rotor R, the coolant flowing through the cooling medium supply path 14 is discharged from the cooling medium supply path 14 to the radial outer side of the cooling medium supply member 11, through the cooling medium supply hole 12 and the supply opening portion 13. The coolant thus discharged is supplied to the cooling medium flow space 80 formed between the outer circumferential face 11A of the cooling medium supply member 11 and the cooling inner circumferential face CP.

In the present embodiment, the supply opening portion 13 is disposed at the center portion of the rotor core body RC in the rotor axial direction. The center portion of the rotor core body RC in the rotor axial direction corresponds to a center region that divides the rotor core body RC into three equal parts (preferably a center region that divides the rotor core body RC into five equal parts) along the rotor axial direction. In the example shown in the drawings, the supply opening portion 13 is provided at a central position of the rotor core body RC in the axial direction. The supply opening portion 13 is preferably provided at such a center portion of the rotor core body RC in the rotor axial direction. Coolant supplied from the supply opening portion 13 to the cooling medium flow space 80 is discharged from a cooling medium discharge hole 20, which is provided in the vicinity of both axial end portions of the cooling medium flow space 80, by the centrifugal force generated in accordance with the rotation of the rotor R. This is accompanied by such coolant moving (flowing) toward the cooling medium discharge hole 20 and toward the rotor axial outer side along the cooling inner circumferential face CP. Thus, the inner circumferential face of the rotor core body RC that contacts the outer circumferential face of the rotor shaft 10 is cooled, whereby the rotor core body RC can be cooled. Consequently, the permanent magnet PM provided in the rotor core body RC can be suitably cooled. Note that when coolant is supplied from the supply opening portion 13 in an amount that fills the cooling medium flow space 80, the coolant flows in a state with the cooling medium flow space 80 fully filled. However, when coolant is not supplied from the supply opening portion 13 in an amount that fills the cooling medium flow space 80 (when the amount of coolant is small with respect to the volume of the cooling medium flow space 80), the coolant flows in close contact with the cooling inner circumferential face CP due to centrifugal force.

The rotor shaft 10 includes the cooling medium discharge hole 20 that extends toward the rotor radial outer side from the cooling medium flow space 80. Extending toward the rotor radial outer side means that the cooling medium discharge hole 20 is formed extending from the cooling medium flow space 80, which is formed in the radial center portion of the rotor shaft 10, toward the radial outer side of the rotor shaft 10. In addition, the cooling medium discharge hole 20 has a discharge opening portion 21 that opens toward the radial outer side, and is more toward the rotor axial outer side than the end face of the rotor core body RC in the rotor axial direction. Here, as mentioned above, the "rotor core" of the present invention includes both the end plate EP and the rotor core body RC. Accordingly, more toward the rotor axial outer side than the end face of the rotor core body RC in the rotor axial direction corresponds to more toward the rotor axial outer side than the axial end face of the end plate EP, and refers to a region more toward the rotor axial outer side than a region in which the inner circumferential face of the rotor core body RC is in contact with the outer circumferential face of the rotor shaft 10 as described above. The discharge opening portion 21 is provided on the outer circumferential face of the rotor shaft 10 within this region on the rotor axial outer side. Accordingly, the cooling medium discharge hole 20 functions as a communication hole that communicates the radial outer side of the rotor shaft 10 with the cooling medium flow space 80. The cooling medium discharge hole 20 and the discharge opening portion 21 are each formed in a plurality along the circumferential direction as viewed from the rotor axial direction. In the present embodiment, a coil end portion CE of the stator S is disposed on the radial outer side of the rotor shaft 10. Thus, the discharge opening portion 21 opens toward the coil end portion CE.

The rotor shaft 10 also includes a flange portion 15 that positions the rotor core body RC in the axial direction. The flange portion 15 corresponds to a part where the outer diameter of the rotor shaft 10 is increased. A part where the outer diameter of the rotor shaft 10 is increased refers to a part that has a larger outer diameter than the axial center portion of the rotor shaft 10 through which the through hole 30 passes. Accordingly, the flange portion 15 is formed with a flange shape. Note that such a part with a large outer diameter includes a part that is integrally provided on the rotor shaft 10, and a part that is separately provided such as an annular member 51 that will be described later. This flange portion 15 corresponds to an "axial positioning portion X" of the present invention. The cooling medium discharge hole 20 described above is provided in this flange portion 15. By thus providing the cooling medium discharge hole 20 in the flange portion 15, the flange portion 15 that positions the rotor core with respect to the rotor shaft 10 can be utilized to provide the cooling medium discharge hole 20 close to the axial end face of the rotor core. Therefore, compared to when the cooling medium discharge hole 20 is provided at a position shifted in the axial direction with respect to the flange portion 15, the rotor shaft 10 can have a shorter axial length. Further, by providing the cooling medium discharge hole 20 close to the axial end face of the rotor core, a coolant discharge route close to the axial end face of the rotor core can also be achieved. A large space that does not interfere with the coolant discharge route can thus be secured. Therefore, this space can be utilized to also provide measurement equipment such as a resolver.

Here, coolant is supplied from the cooling medium flow path A1 formed in the axial central portion of the rotation shaft A to the cooling medium supply path 14 of the cooling medium supply member 11 as described above. Therefore, similar to the rotation shaft A, the cooling medium supply member 11 can be configured so as to rotate around a rotor shaft center thereof as a center of rotation. The cooling medium supply member 11 can be configured so as to have a rotation speed difference with respect to the rotor shaft 10. Having a rotation speed difference means that there is a difference between the rotation speed of the cooling medium supply member 11 and the rotation speed of the rotor shaft 10. The respective rotation speeds may be independently set at mutually different rotation speeds, or the rotation speed of the rotor shaft 10 may be used as a reference and the rotation speed of the cooling medium supply member 11 set through a transmission (not shown). With such configurations, coolant from the supply opening portion 13 is no longer supplied to only a specific location of the cooling inner circumferential face CP in the radial direction, and coolant is more easily distributed over the whole circumference of the cooling inner circumferential face CP. Thus, the cooling inner circumferential face CP can be uniformly cooled.

Here, the cooling medium flow space 80 has a cooling medium storage portion 81 at both end portions of the cooling medium flow space 80 in the rotor axial direction. The cooling medium storage portion 81 expands outward in the rotor radial direction and can store coolant. Expanding outward in the rotor radial direction means that the inner diameter of the cooling medium flow space 80 is enlarged, that is, the inner diameter of the cooling medium flow space 80 is increased. Thus, the cooling medium storage portion 81 corresponds to an increased-diameter portion that is formed by enlarging the inner diameter of both end portions of the cooling medium flow space 80 in the rotor axial direction.

The cooling medium discharge hole 20 described above is formed so as to extend toward the rotor radial outer side from this cooling medium storage portion 81. Extending toward the rotor radial outer side means that the cooling medium discharge hole 20 is formed extending from the cooling medium storage portion 81, which is formed at both end portions of the cooling medium flow space 80 in the rotor axial direction, toward the radial outer side of the rotor shaft 10.

In addition, the cooling medium flow space 80 is defined by an end wall portion 82 that faces the rotor axial center side, and is respectively provided at both end portions of the cooling medium flow space 80 in the rotor axial direction. The end wall portion 82 that faces the rotor axial center side is not limited to only a state in which the wall face of the end wall portion 82 is orthogonal to the rotor axial direction, and any orientation is acceptable provided that the end wall portion 82 has at least a component where the normal vector of the wall face of the end wall portion 82 faces the rotor axial center side. In other words, the end wall portion 82 may be at an angle with respect to the rotor axial direction. This end wall portion 82 functions as a damming mechanism that dams the flow of coolant flowing along the cooling inner circumferential face CP to the rotor axial end portion, and can restrict the flow of coolant along the rotor axial direction. It is thus possible to suppress coolant from leaking axially outward from the cooling medium flow space 80.

The end wall portion 82 is preferably configured by a stepped portion of the inner circumferential face of the rotor shaft 10, which is formed such that the center side of the end wall portion 82 in the rotor axial direction is farther outward in the radial direction than the outer side of the end wall portion 82 in the rotor axial direction. Formed such that the center side in the rotor axial direction is farther outward in the radial direction than the outer side in the rotor axial direction means that, as shown in FIGS. 1 and 3, the inner diameter of the center side in the rotor axial direction is formed larger than the inner diameter of the outer side in the rotor axial direction. This shape can be achieved by forming the stepped portion on the inner circumferential face of the rotor shaft 10. The end wall portion 82 is formed by an interface between the rotor axial center side and the rotor axial outer side whose inner diameter is smaller than the inner diameter of the rotor axial center side. Forming this end wall portion 82 eliminates the need to provide a separate member for forming a separate end wall portion 82, and therefore the end wall portion 82 can be achieved at low cost.

From the cooling medium discharge hole 20, coolant is discharged from the radial inner side toward the radial outer side of the rotor shaft 10. In other words, coolant that flows along the cooling inner circumferential face CP and is stored in the cooling medium storage portion 81 is discharged from the cooling medium discharge hole 20 toward the radial outer side of the rotor shaft 10. Here, in the rotor shaft 10 according to the present embodiment, coolant is discharged from a left-hand portion of FIG. 1 through the cooling medium discharge hole 20 and the discharge opening portion 21. Meanwhile, coolant discharged from the cooling medium discharge hole 20 and the discharge opening portion 21 from a right-hand portion of FIG. 1 is emitted through a radial discharge hole 52 that is radially formed in the annular member 51, which is provided between a shaft-end fixing member 50 that fixes the rotor R along the rotor axial center and one end plate ER. The shaft-end fixing member 50 and the annular member 51 are both flange-like members that position the rotor core body RC in the axial direction, and correspond to the "axial positioning portion X" of the present invention.

The cooling medium discharge hole 20 (the radial discharge hole 52 when the annular member 51 is provided) acts as a spray hole through which coolant is sprayed toward the coil end portion CE of the stator S, which is provided on the radial outer side of the rotor core body RC. The stator S is configured to include a stator core SC that is disposed on the radial outer side of the rotor core body RC and fixed to the case body MC1. The coil end portion CE of the coil C wound around the stator core SC is positioned on the outer side of both axial ends of the stator core SC. The stator core SC is formed by laminating a plurality of disk-shaped steel plates along the axial center direction of the rotor core body RC.

The coil C is formed by winding a conductor around the stator core SC. This coil C is provided on the inner circumferential side of the stator core SC and inserted into a plurality of slots. In addition, a part of the coil C that links two slots is formed projecting from the stator core SC toward both axial ends thereof. The projection portion that thus projects from the stator core SC toward both axial ends thereof is the coil end portion CE.

Because the coil C is thus formed with the above configuration, due to the centrifugal force generated by the rotation of the rotor R, coolant from the cooling medium discharge hole 20 is sprayed toward the coil end portion CE on the radial outer side. Therefore, the heat-generating coil C can be suitably cooled in accordance with the rotation of the rotating electric machine M. Coolant spraying from the cooling medium discharge hole 20 (the radial discharge hole 52 when the annular member 51 is provided) is shown by a dashed line 60 in FIG. 1. By thus spraying coolant at the coil end portion CE, the coolant that cools the rotor R (the permanent magnet PM provided in the rotor R) can be utilized to further cool the coil C in a suitable manner through the coil end portion CE of the stator S.

As described above, the centrifugal force generated in accordance with the rotation of the rotor R is utilized to discharge coolant from the cooling medium discharge hole 20 that is provided on the outer side of the cooling medium flow space 80 in the rotor axial direction. Coolant can consequently flow along the cooling inner circumferential face CP, which is the inner circumferential face of the cooling medium flow space 80 formed inside the rotor shaft 10, toward the cooling medium discharge hole 20. The inner circumferential face of the rotor core body RC is in heat-transferable contact with the rotor shaft 10 that has the cooling inner circumferential face CP. Therefore, the rotor core body RC can be cooled from the inner circumferential face side. Because a structure is achieved in which the rotor core body RC is cooled by making coolant flow inside the rotor shaft 10 as described above, there is no need for a structure that prevents coolant leakage as in the case of a configuration in which coolant flows inside the rotor core body RC. Thus, according to the present invention, the rotor R can be inexpensively formed. In addition, the discharge opening portion 21 that opens toward the radial outer side from the cooling medium flow space 80 is provided farther outward in the rotor axial direction than the axial end face of the rotor core body RC. Therefore, coolant can be moved along the cooling inner circumferential face CP. As a consequence, the inner circumferential face of the rotor core body RC can be suitably cooled. Thus, if provided in the rotor core body RC, the permanent magnet PM can also be suitably cooled. Further, the discharge opening portion 21 that discharges coolant from the cooling medium flow space 80 is provided facing toward the rotor radial outer side from the cooling medium flow space 80. Therefore, coolant is in effect discharged from the rotor shaft 10. For this reason, less energy is applied to coolant to discharge the coolant (compared to a structure in which coolant is discharged from the rotor core body RC, which is on the radial outer side of the rotor shaft 10), and the rotary reaction force from the coolant can thus be reduced. Because this lowers the consumption of kinetic energy related to the rotation of the rotor core body RC, the rotation efficiency of the rotor R can be increased.

2. Second Embodiment

Next, a second embodiment of the rotor R according to the present invention will be described. The rotor R of the second embodiment differs from the rotor R of the first embodiment described above in that the annular member 51 formed with the radial discharge hole 52 is not provided, and the discharge opening portion 21 is not formed on the flange portion 15. Otherwise, the rotor R of the second embodiment is identical to the rotor R of the first embodiment. The following description will thus focus on points where the rotor R of the second embodiment differs from the rotor R of the first embodiment.

Figure 4:
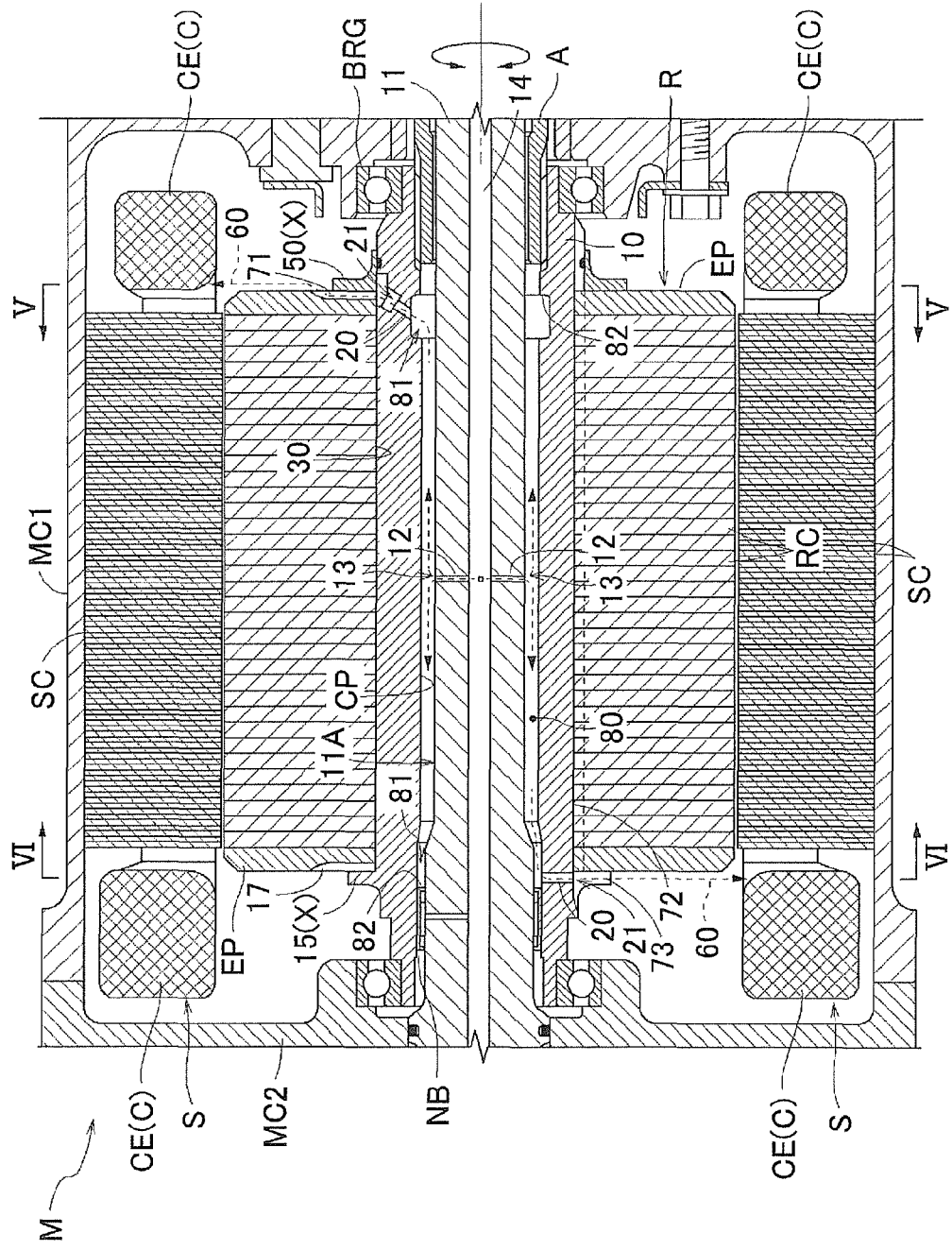
FIG. 4 is a view that shows a side cross section of the rotating electric machine according to a second embodiment.
Figure 5:
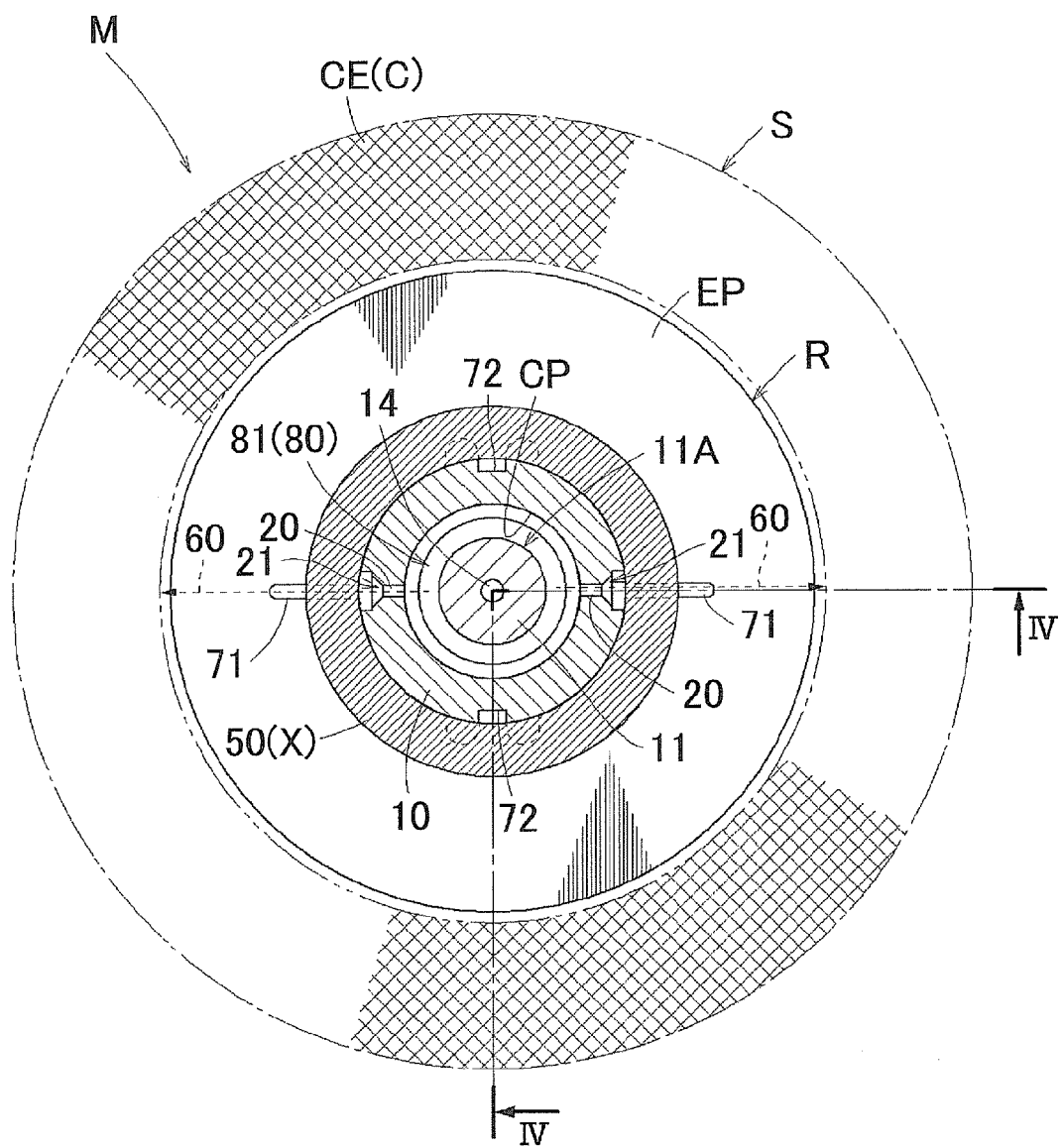
FIG. 5 is a view that shows a cross section taken along a line V-V in FIG. 4.
Figure 6:
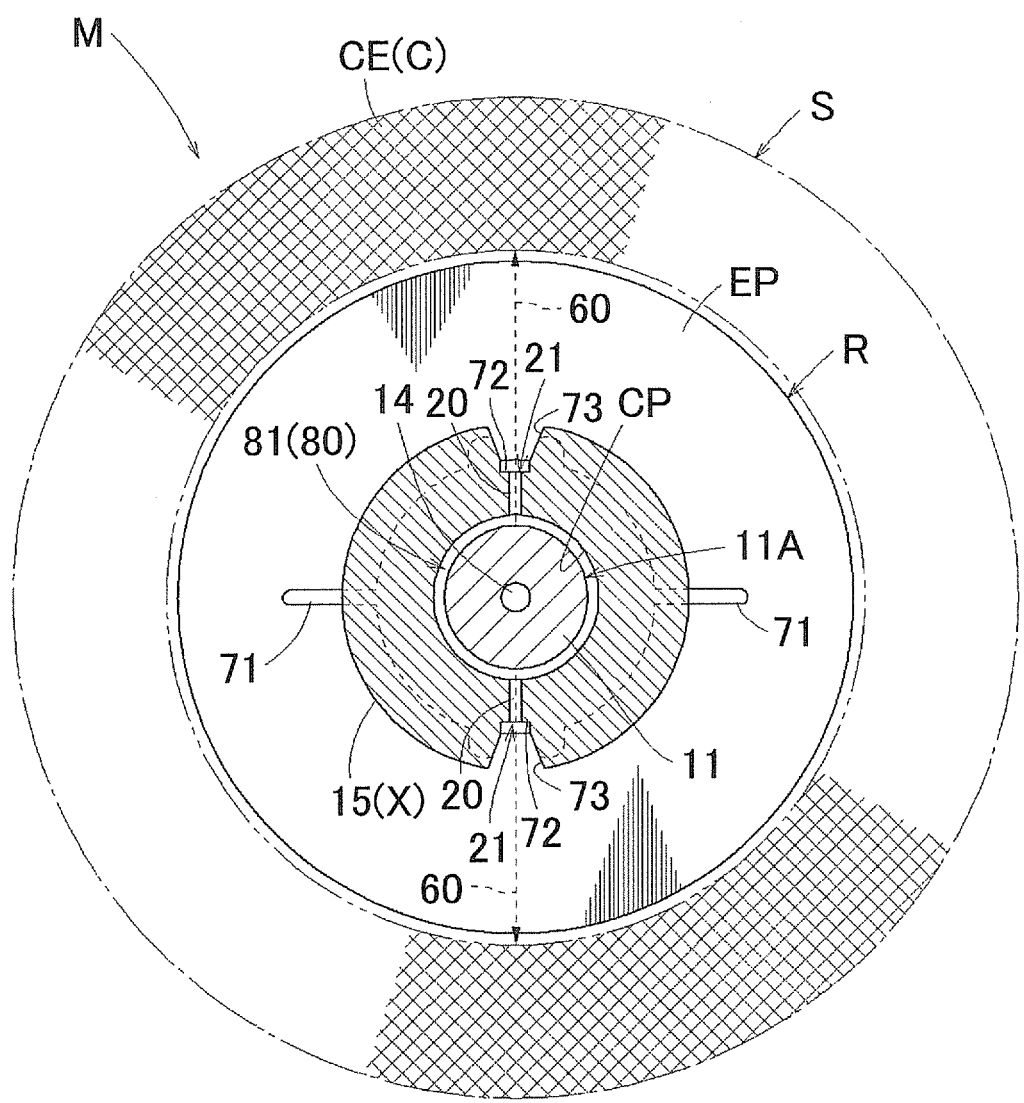
FIG. 6 is a view that shows a cross section taken along a line VT-VT in FIG. 4.
Figure 7:
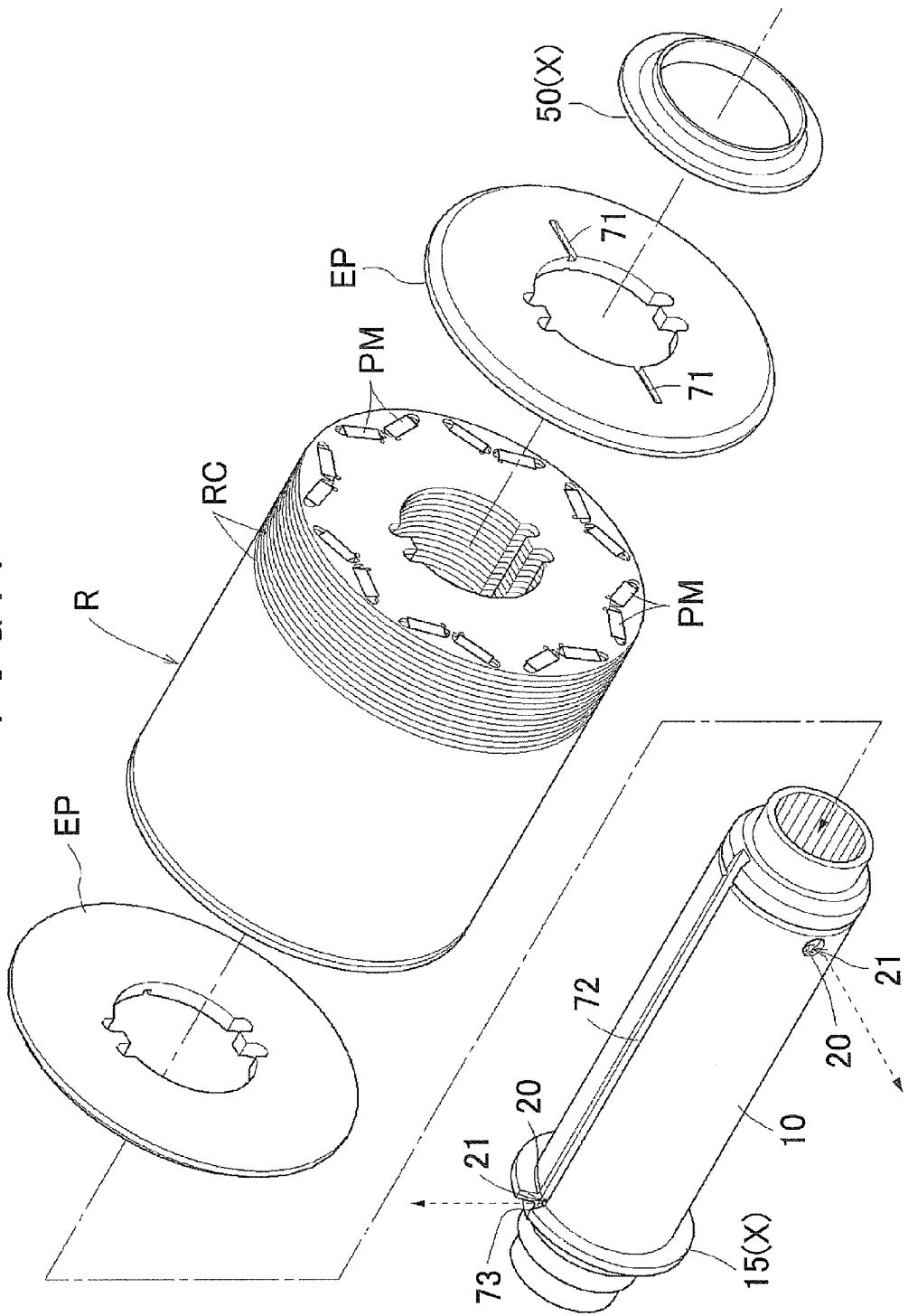
FIG. 7 is an exploded perspective view of the rotor according to the second embodiment.

FIG. 4 shows a side cross-sectional view of the rotating electric machine M that is provided with the rotor R according to the present embodiment. FIG. 5 shows a cross section taken along a line V-V in FIG. 4, and FIG. 6 shows a cross section taken along a line VI-VI in FIG. 4. FIG. 7 shows an exploded perspective view of the rotor R. As shown in FIGS. 4 to 7, the rotor shaft 10 provided with the rotor R of the second embodiment includes a radial groove 71, a groove portion 72, and a cutout portion 73.

Here, in the present embodiment as well, the flange portion 15 is provided in contact with the axial end face of the end plate EP. The flange portion 15 is fixed to the rotor shaft 10. This flange portion 15 is formed integrated with the rotor shaft 10 on one axial side of the rotor shaft 10. The other axial side of the rotor shaft 10 is provided with the flange-like shaft-end fixing member 50. The shaft-end fixing member 50 is formed separate from the rotor shaft 10, and fixed by crimping or welding, for example, to the rotor shaft 10. The flange portion 15 and the shaft-end fixing member 50 both correspond to the "axial positioning portion X" of the present invention and position the rotor core body RC in the axial direction.

The radial groove 71 is formed on the end plate EP so as to extend in the rotor radial direction along the faces of contact between the end plate EP and the flange portion 15, and between the end plate EP and the shaft-end fixing member 50. The radial groove 71 is formed with a constant groove depth from the radial inner side to a predetermined position in the rotor radial direction, and the groove depth is formed so as to become shallower outward in the rotor radial direction from the predetermined position. Therefore, coolant that flows through the radial groove 71 can be more easily discharged from the radial groove 71, as will be described later. Specifically, the radial groove 71 is formed such that the groove depth becomes shallower radially outward from the outer circumferential face of the shaft-end fixing member 50.

Here, in the present embodiment, the radial groove 71 that is formed on the end plate EP on the side provided with the shaft-end fixing member 50 (the right side of FIG. 4) communicates with the discharge opening portion 21, and is provided on the radial outer side of the discharge opening portion 21. The discharge opening portion 21 refers to an opening portion that opens toward the radial outer side where the cooling medium discharge hole 20 is located, and discharges coolant that flows along the cooling inner circumferential face CP radially outward from the cooling inner circumferential face CP in accordance with the centrifugal force generated by the rotation of the rotor R. Coolant that is discharged radially outward flows through the radial groove 71. In the present embodiment, this radial groove 71 is provided at 180-degree intervals along the circumferential direction, as shown in FIG. 5. The radial groove 71 may obviously be provided at intervals other than 180-degree intervals. Naturally, three or more radial grooves 71 may be provided, or only one radial groove 71 may be provided.

In the present embodiment as well, the cooling medium storage portion 81 is provided at both end portions of the cooling medium flow space 80 in the rotor axial direction. The cooling medium storage portion 81 expands outward in the rotor radial direction and can store coolant. The cooling medium flow space 80 is defined by the end wall portion 82 that faces the rotor axial center side, and is respectively provided at both end portions of the cooling medium flow space 80 in the rotor axial direction. The cooling medium discharge hole 20 is provided extending from the cooling medium flow space 80.

As shown in FIG. 7, the groove portion 72 is formed on the outer circumferential face of the rotor shaft 10 and extends in the rotor axial direction. The groove portion 72 has a predetermined depth and is formed spanning from one end to the other end of the rotor shaft 10, parallel to the axial center of the rotor shaft 10. This depth is formed so as to be smaller than a radial thickness of the rotor shaft 10. Accordingly, the groove portion 72 is constituted with a bottom portion. A protruding portion is formed on the inner circumferential faces of the rotor core body RC and the end plate EP so as to engage with this groove portion 72. Thus, circumferential positioning of the rotor core body RC can be suitably performed. In this example, the groove portion 72 and the protruding portion on the inner circumferential faces of the rotor core body RC and the end plate EP have a keyway-key relationship.

In the present embodiment, the cutout portion 73 is formed on the flange portion 15 on the left side of FIG. 4. The cutout portion 73 is formed by cutting out the radial outer side of the groove portion 72. Note that positioning of the rotor core body RC in the axial direction can obviously be performed even with the flange portion 15 having this cutout portion 73. The discharge opening portion 21 is provided in the bottom portion of the groove portion 72 within the cutout portion 73. Therefore, the cooling medium discharge hole 20 need not be formed in the flange portion 15 so long as the cooling medium discharge hole 20 is formed from the cooling medium flow space 80 to the bottom portion of the groove portion 21. The cooling medium discharge hole 20 can thus have a shorter length, which can facilitate its shaping and reduce manufacturing costs.

The cutout portion 73 is also formed such that its circumferential length (width) increases radially outward. The circumferential length refers to the length in the circumferential direction. The cutout portion 73 is further formed such that its circumferential length is shortest at the bottom portion of the groove portion 72, and its circumferential length increases radially outward from the bottom portion. Accordingly, the cutout portion 73 is formed into a fan-like configuration as shown in FIG. 6 in an axial view. The fan-like configuration is not limited to a fan shape, and also includes a configuration in which the corner portion is shaped as a circular arc.

Here, in the present embodiment, the end plate EP on the left side of FIG. 4 is also formed with the radial groove 71, but this is not required. That is, the radial groove 71 may not be formed on the left-side end plate EP. As shown in FIG. 4, by forming the radial groove 71 on both the left and right end plates EP, the end plate EP can be made common to both sides in the rotor axial direction, which simplifies management of the end plates EP as well as the manufacturing process of the rotor R. Further, in a section on the left side of FIG. 4, the axial center side of a needle bearing NB corresponds to the cooling medium storage portion 81 that stores coolant, and the end face of the needle bearing NB on the axial center side corresponds to the end wall portion 82. The configurations of the radial groove 71 and the shaft-end fixing member 50 shown in a section on the right side of FIG. 4 can be applied to both sides in the axial direction, and the configuration of the flange portion 15 shown in a section on the left side of FIG. 4 can also be applied to both sides in the axial direction.

Even with such a mode, the centrifugal force generated by the rotation of the rotor R can be utilized to make coolant flow along the cooling inner circumferential face CP that is the inner circumferential face of the cooling medium flow space 80. The whole axial area of the inner circumferential face of the rotor core body RC is in heat-transferable contact with the rotor shaft 10 that has the cooling inner circumferential face CP. Therefore, the rotor core body RC can be cooled from the inner circumferential face side. Even with this configuration, the rotary reaction force from the coolant can be reduced. Because this lowers the consumption of kinetic energy related to the rotation of the rotor core body RC, the rotation efficiency of the rotor R can be increased.

3. Third Embodiment

Next, a third embodiment of the rotor R according to the present invention will be described. The rotor R of the third embodiment differs from the rotor R of the first embodiment described above in that the cooling medium discharge hole 20 includes an axial groove 91. Otherwise, the rotor R of the third embodiment is identical to the rotor R of the first embodiment. The following description will thus focus on points where the rotor R of the third embodiment differs from the rotor R of the first embodiment.

Figure 8:
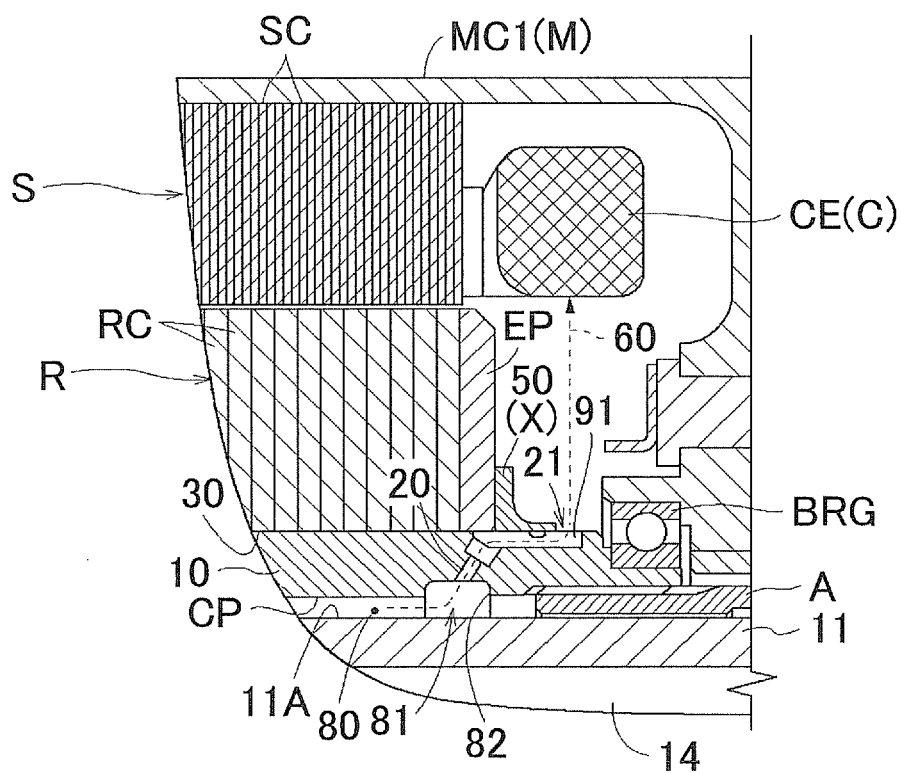
FIG. 8 is a partial cross-sectional view of the rotor according to a third embodiment.
Figure 9:
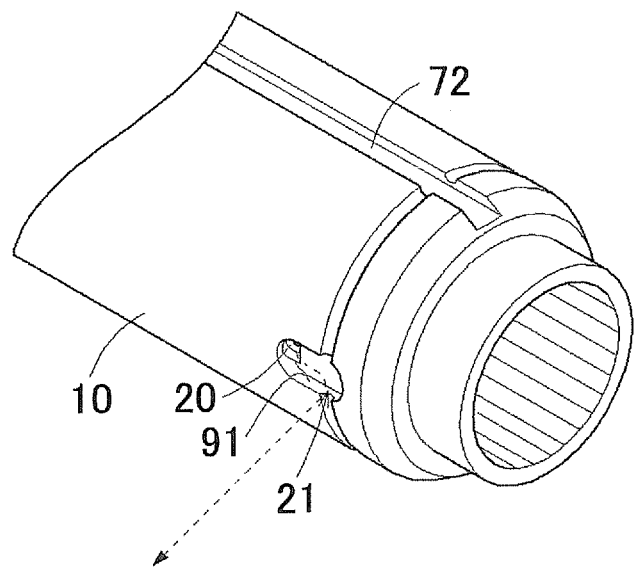
FIG. 9 is a partial perspective view of the rotor according to the third embodiment.

FIG. 8 shows a partial side cross-sectional view of the rotating electric machine M that is provided with the rotor R according to the present embodiment. FIG. 9 shows a partial perspective view of the rotor shaft 10. As shown in FIGS. 8 and 9, the rotor shaft 10 provided with the rotor R of the third embodiment includes the axial groove 91.

Here, similar to the second embodiment described above, the shaft-end fixing member 50 is provided in contact with the axial end face of the end plate EP in the present embodiment as well. The shaft-end fixing member 50 is fixed to the outer circumferential face of the rotor shaft 10. In the present embodiment as well, the shaft-end fixing member 50 is formed separate from the rotor shaft 10, and fixed by crimping or welding, for example, to the rotor shaft 10. This shaft-end fixing member 50 corresponds to the "axial positioning portion X" of the present invention and positions the rotor core body RC in the axial direction.

Similar to the rotor R according to the first embodiment and the second embodiment described above, the rotor R according to the present embodiment is configured with the cooling medium discharge hole 20 extending from the cooling medium flow space 80 toward the rotor radial outer side. In the present embodiment, the cooling medium discharge hole 20 is configured to include the axial groove 91. The axial groove 91 is formed on the outer circumferential face of the rotor shaft 10 so as to extend in the rotor axial direction along the faces of contact between the inner circumferential face of the shaft-end fixing member 50 and the outer circumferential face of the rotor shaft 10. As shown in FIGS. 8 and 9, the cooling medium discharge hole 20 is provided extending from the cooling medium storage portion 81 toward the radial outer side. The radial outer portion of this cooling medium discharge hole 20 corresponds to the axial groove 91. The axial groove 91 is formed by cutting out the outer circumferential face of the rotor shaft 10 to a predetermined depth as shown in FIG. 9. The shaft-end fixing member 50 covers part of the radial outer portion of the axial groove 91 thus formed by cutting out.

The axial groove 91 extends from the shaft-end fixing member 50 toward the rotor axial outer side, and the discharge opening portion 21 is provided on the end portion of the axial groove 91 on the rotor axial side. That is, a part of the axial groove 91 on the radial outer side not covered by the shaft-end fixing member 50 corresponds to the discharge opening portion 21. With this configuration, the discharge opening portion 21 can be provided on the radial inner side of the coil end portion CE. Therefore, coolant discharged from the discharge opening portion 21 can be suitably supplied to the coil end portion CE.

Even with this configuration, the rotary reaction force from the coolant can be reduced. Because this lowers the consumption of kinetic energy related to the rotation of the rotor core body RC, the rotation efficiency of the rotor R can be increased.

Other Embodiments (1) In the embodiments described above, the cooling medium storage portion 81 is provided at both end portions of the cooling medium flow space 80 in the rotor axial direction. The cooling medium storage portion 81 expands outward in the rotor radial direction and can store coolant. However, the scope of the present invention is not limited to this example. Obviously, the cooling medium storage portion 81 may be provided on only one end portion in the rotor axial direction, and the rotor shaft 10 may be configured without providing the cooling medium storage portion 81 on both end portions in the rotor axial direction. Further, by enlarging the inner diameter of the whole area of the cooling medium flow space 80 in the rotor axial direction, the cooling medium flow space 80 can be formed so as to have the function of the cooling medium storage portion 81 over its whole area in the rotor axial direction.

(2) In the embodiments described above, the cooling medium flow space 80 is defined by the end wall portion 82 that faces the rotor axial center side, and is respectively provided at both end portions of the cooling medium flow space 80 in the rotor axial direction. However, the scope of the present invention is not limited to this example. Obviously, the cooling medium flow space 80 may be formed without providing the end wall portion 82. In such case, for example, the cooling medium storage portion 81 is not provided and the cooling inner circumferential face CP has a cylindrical shape with a constant diameter across a whole axial area.

(3) In the embodiments described above, the end wall portion 82 is configured by the stepped portion on the inner circumferential face of the rotor shaft 10. However, the scope of the present invention is not limited to this example. Besides the rotor shaft 10, the end wall portion 82 may obviously be formed by providing a separate member.

(4) In the embodiments described above, the cooling medium supply member 11 has a rotation speed difference with respect to the rotor shaft 10. To set such a rotation speed difference, the rotation speed of the cooling medium supply member 11 may be set to a rotation speed that is faster than the rotation speed of the rotor shaft 10, or the rotation speed of the cooling medium supply member 11 may be set to a rotation speed that is slower than the rotation speed of the rotor shaft 10. Of course, a configuration in which the cooling medium supply member 11 does not rotate is obviously acceptable. In another obviously acceptable configuration, the rotation speed of the cooling medium supply member 11 and the rotation speed of the rotor shaft 10 are the same rotation speed.

Figure 10:
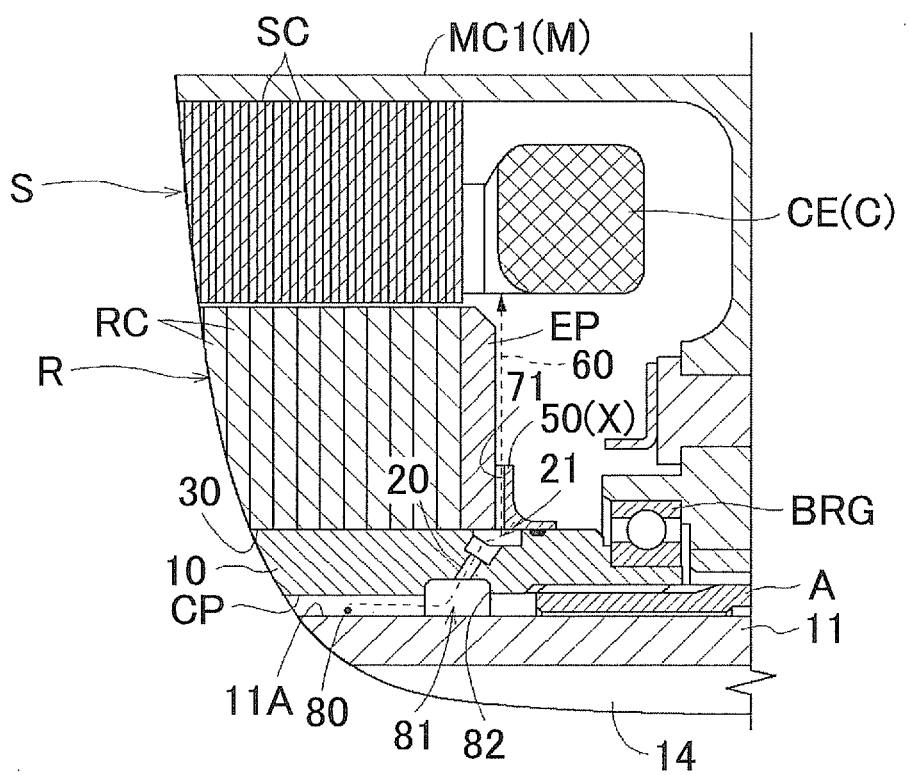
FIG. 10 is a partial cross-sectional view of the rotor according to another embodiment.
Figure 11:
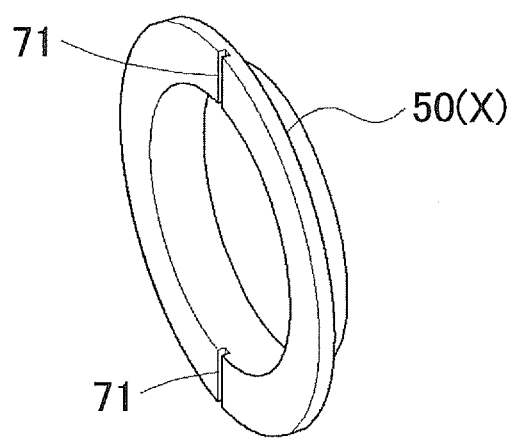
FIG. 11 is a perspective view of a shaft-end fixing member according to another embodiment.

(5) The second embodiment described above gives an example in which the radial groove 71 is formed on the end plate EP so as to extend in the rotor radial direction along the faces of contact between the end plate EP and the shaft-end fixing member 50. However, the scope of the present invention is not limited to this example. In another example, as shown in FIGS. 10 and 11, the radial groove 71 may be configured on the shaft-end fixing member 50 so as to extend in the rotor radial direction along the faces of contact between the end plate EP and the shaft-end fixing member 50.

Figure 12:
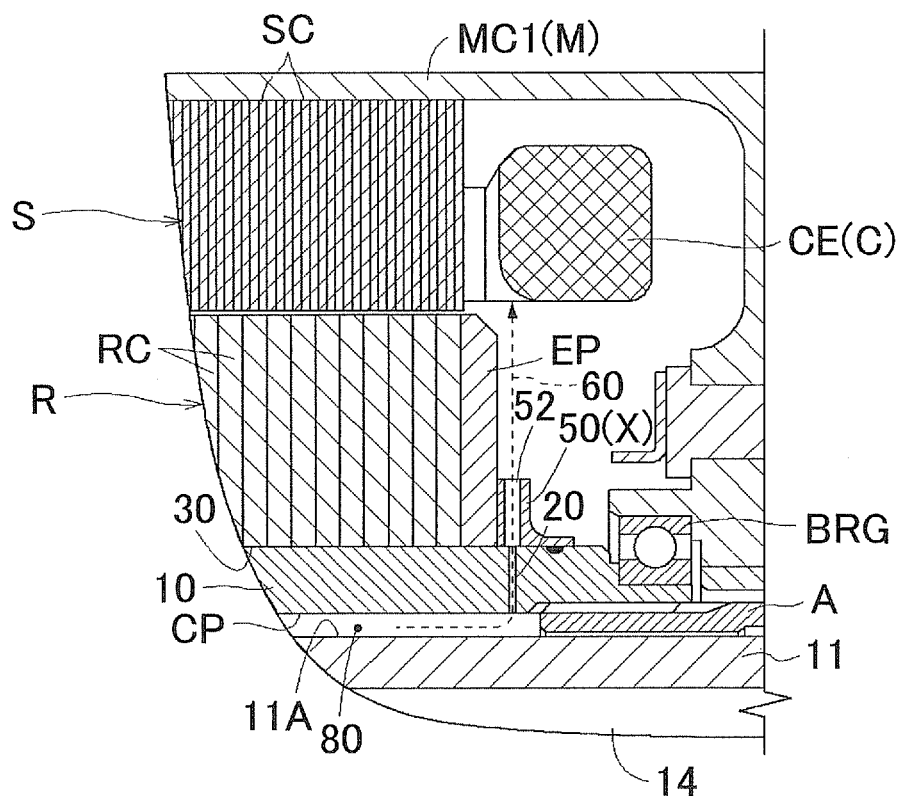
FIG. 12 is a partial cross-sectional view of the rotor according to another embodiment.
Figure 13:
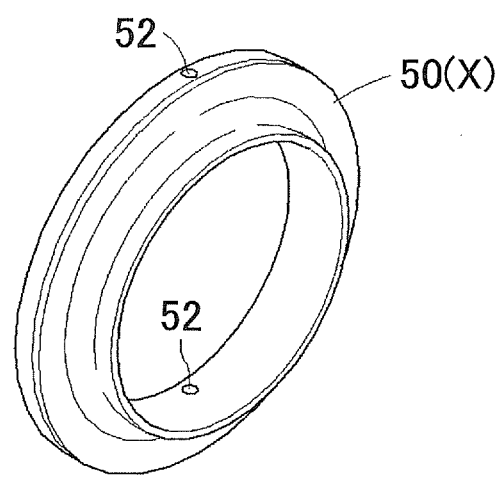
FIG. 13 is a perspective view of the shaft-end fixing member according to another embodiment.

Alternatively, as shown in FIG. 12, a configuration that provides the radial discharge hole 52 passing in the radial direction through the large diameter portion of the shaft-end fixing portion 50 is also acceptable. A perspective view of the shaft-end fixing member 50 preferably used in this configuration is shown in FIG. 13.

Figure 14:
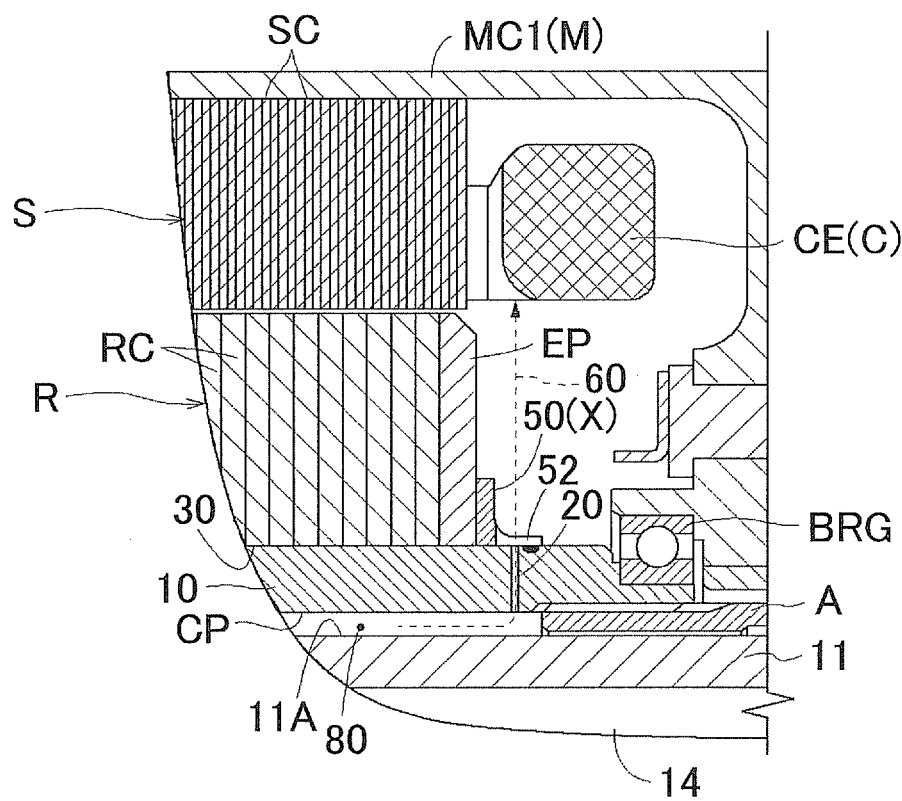
FIG. 14 is a partial cross-sectional view of the rotor according to another embodiment.
Figure 15:
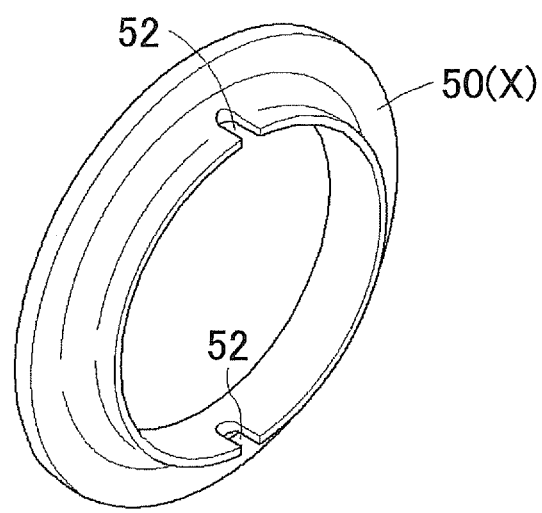
FIG. 15 is a perspective view of the shaft-end fixing member according to another embodiment.

Further, as shown in FIG. 14, a configuration that provides the radial discharge hole 52 on the small diameter portion of the shaft-end fixing portion 50 is also acceptable. A perspective view of the shaft-end fixing member 50 preferably used in this configuration is shown in FIG. 15. In the example of the drawing, the radial discharge hole 52 is a cutout portion that continues to the axial end face of the small diameter portion of the shaft-end fixing member 50, but the radial discharge hole 52 is preferably a through hole that passes through the small diameter portion of the shaft-end fixing member 50 in the radial direction.

Even with these configurations, similar to the embodiments described above, the rotary reaction force from the coolant can be reduced. Because this lowers the consumption of kinetic energy related to the rotation of the rotor core body RC, the rotation efficiency of the rotor R can be increased.

Figure 16:
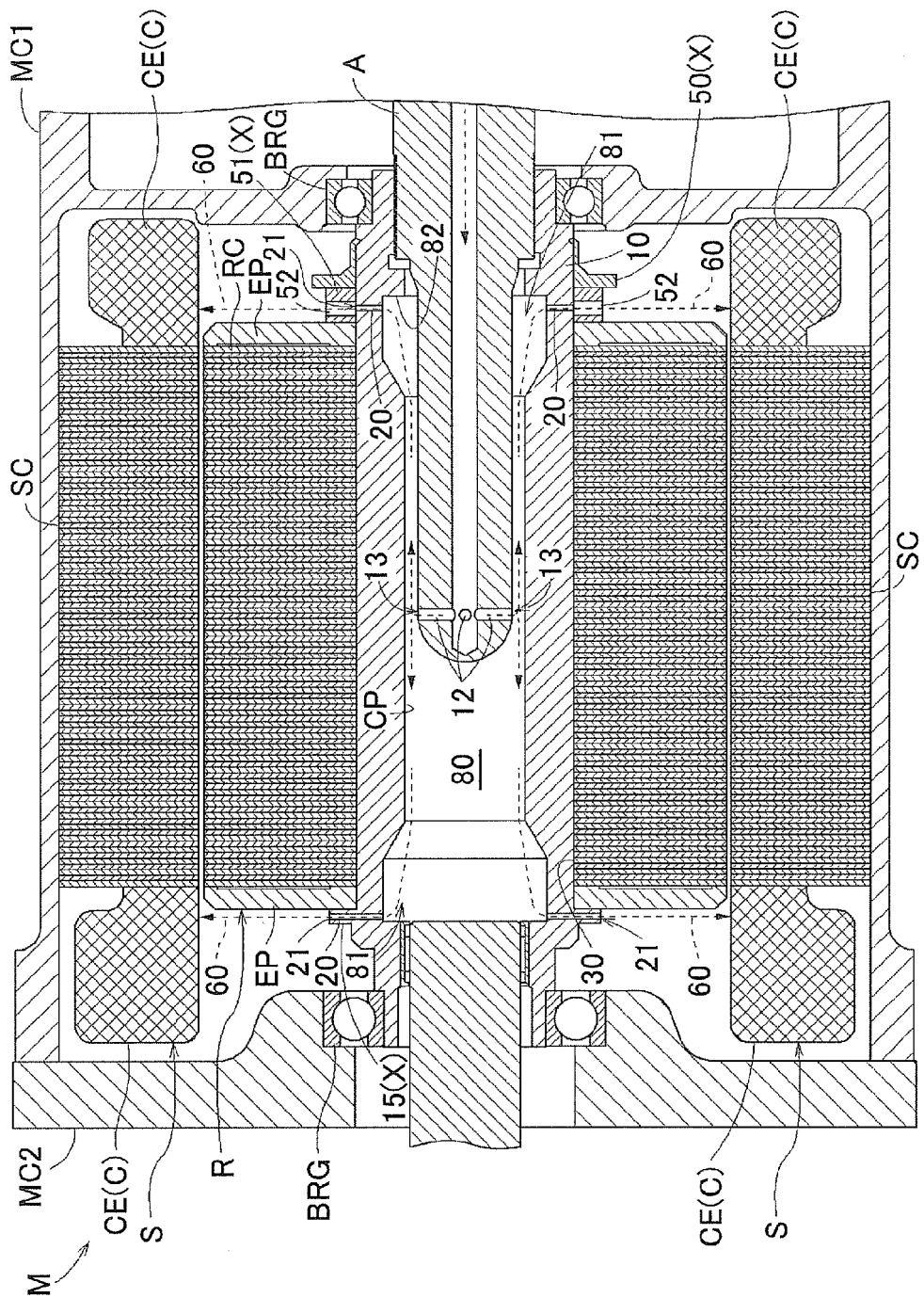
FIG. 16 is a view that shows a side cross section of the rotating electric machine according to another embodiment.

(6) In the embodiments described above, the cooling medium supply member 11 is a penetrating shaft that is disposed so as to pass through the cooling medium flow space 80. However, the scope of the present invention is not limited to this example. Obviously, the cooling medium supply member 11 may be configured by a cooling medium supply member 11 that does not pass through the cooling medium flow space 80 as shown in FIG. 16. In such case, the cooling medium flow member 11 may be configured so as to be supported at one end portion thereof in the rotor axial direction.

Figure 17:
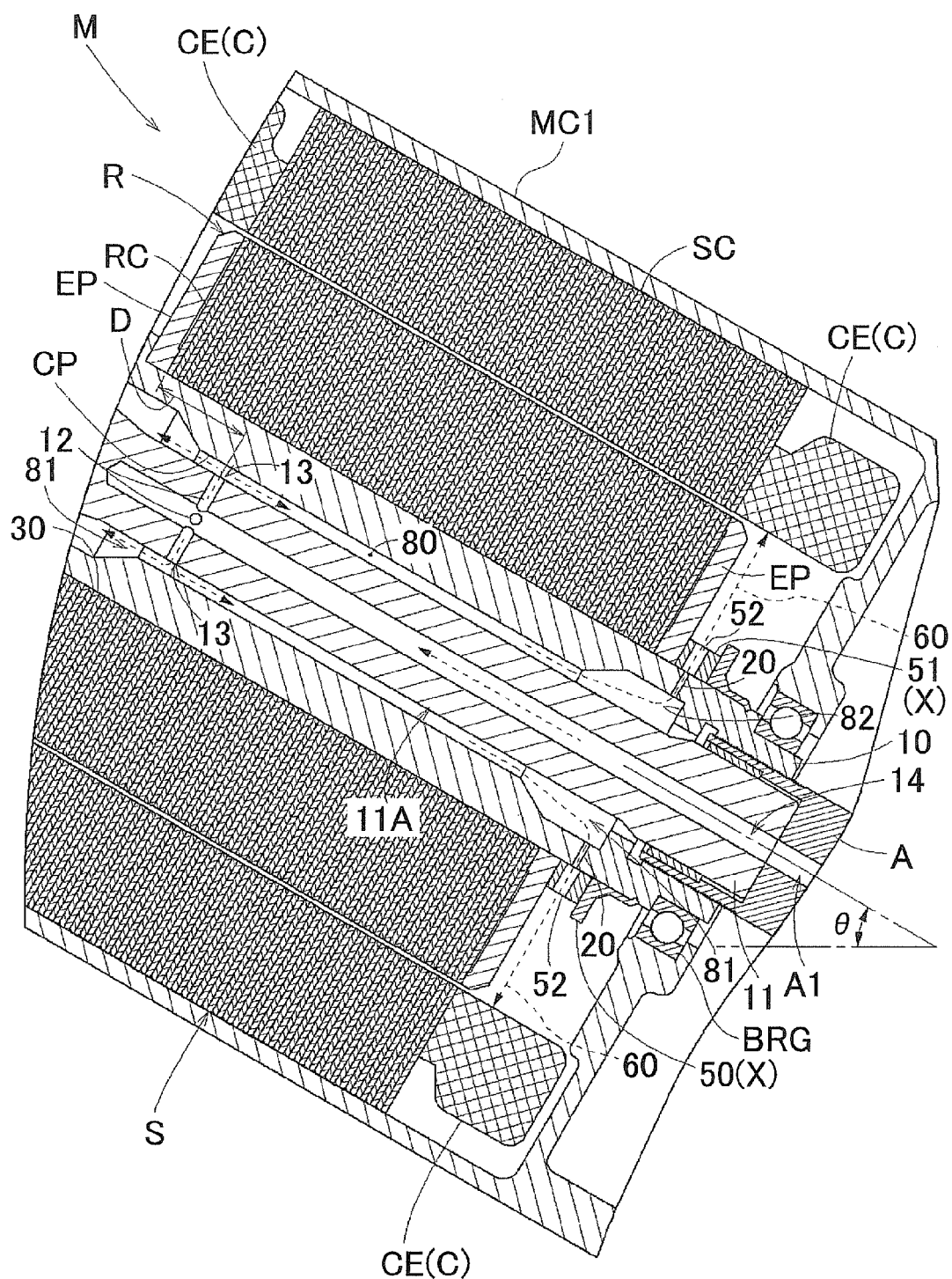
FIG. 17 is a view that shows a side cross section of the rotating electric machine according to another embodiment.

(7) In the embodiments described above, the supply opening portion 13 is disposed at the center portion of the rotor core body RC in the rotor axial direction. However, the scope of the present invention is not limited to this example. For example, as shown in FIG. 17, if the rotor shaft 10 is inclined with respect to the horizontal direction, the supply opening portion 13 is preferably shifted upward along the rotor axial direction from the center portion in the rotor axial direction in accordance with the inclination angle of the rotor shaft 10 with respect to the horizontal direction. In such case, a position D from the upper end face of the rotor core body RC in the rotor axial direction is preferably set in accordance with an angle θ formed between the rotor shaft 10 and a horizontal plane. By thus configuring the supply opening portion 13, coolant can flow over the whole area of the cooling inner circumferential face CP. Therefore, the permanent magnet PM can be suitably cooled.

(8) In the embodiments described above, the cooling medium discharge hole 20 is provided at both ends of the rotor core body RC in the rotor axial direction. However, the scope of the present invention is not limited to this example. Obviously, the cooling medium discharge hole 20 may be provided at only one end portion in the rotor axial direction.

(9) In the embodiments described above, the cooling medium discharge hole 20 acts as a spray hole through which coolant is sprayed toward the coil end portion CE of the stator S, which is provided on the radial outer side of the rotor core body RC. However, the scope of the present invention is not limited to this example. Obviously, a configuration in which the cooling medium discharge hole 20 is not used as a spray hole is also acceptable.

Figure 18:
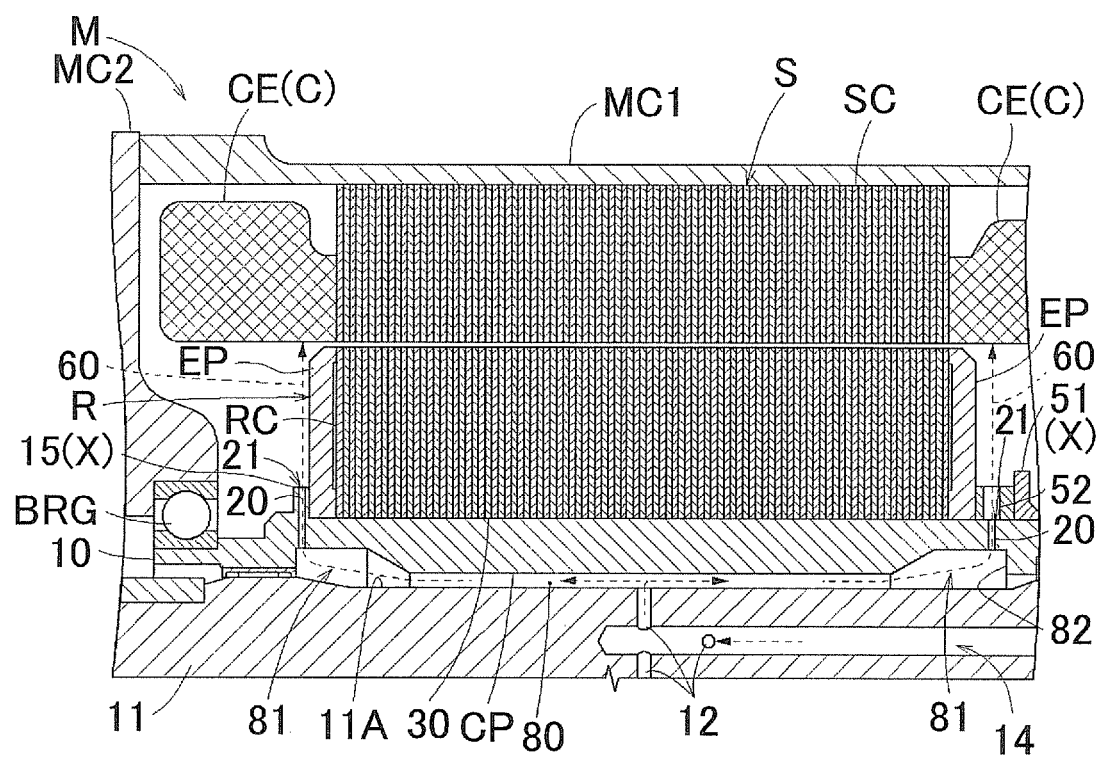
FIG. 18 is a view that shows a side cross section of the rotating electric machine according to another embodiment.
Figure 19:
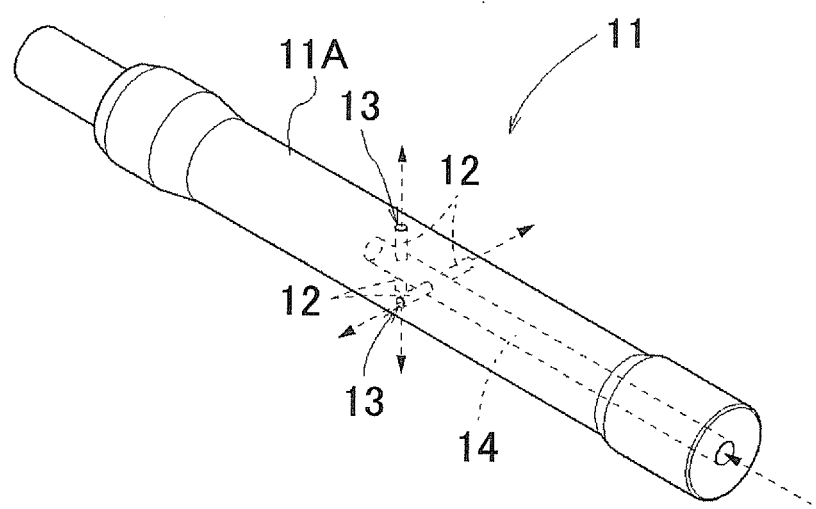
FIG. 19 is a perspective view of a cooling medium supply member shown in FIG. 18.

(10) In the embodiments described above, the cooling medium supply hole 12 is formed in a plurality along the circumferential direction in the outer circumferential face 11A of the cooling medium supply member 11. The plurality of supply opening portions 13 is shown arranged in a line with respect to the rotor axial direction when viewed in the cross-sectional direction of the rotating electric machine M shown in FIG. 1. However, the scope of the present invention is not limited to this example. FIG. 18 shows a side cross-sectional view of the rotating electric machine M according to another embodiment. FIG. 19 shows a perspective view of the cooling medium supply member 11 shown in FIG. 18. As shown in FIGS. 18 and 19, it is possible to dispose at least part of the plurality of supply opening portions 13 at different positions in the rotor axial direction with respect to the other supply opening portions 13.

(11) In the embodiments described above, the whole axial area of the inner circumferential face of the rotor core body RC is in heat-transferable contact with the outer circumferential face of the rotor shaft 10. However, the scope of the present invention is not limited to this example. A configuration in which part of the inner circumferential face of the rotor core body RC in the axial direction is in heat-transferable contact with the outer circumferential face of the rotor shaft 10 is also acceptable. That is, in another acceptable configuration, the cylindrical outer circumferential face of the rotor shaft 10 is provided with a support member that supports the rotor core body RC and whose axial length is shorter than the axial length of the rotor core body RC. In this case as well, the inner circumferential face of the rotor core body RC can be suitably cooled through the support member.

The present invention can be utilized in a rotor for a rotating electric machine that has a cylindrical rotor core and a rotor shaft fixed so as to rotate together with the rotor core.

The invention claimed is:

1. A rotor for a rotating electric machine comprising:
    a cylindrical rotor core positioned on a radial inner side of a stator that includes a stator core and a coil end portion protruding toward an axial direction from the stator core; and
    a rotor shaft fixed so as to rotate together with the rotor core, wherein
        the rotor core includes a rotor core body, an end plate that is mounted to an axial end face of the rotor core body and a permanent magnet that is provided in the rotor core body,
        an inner circumferential face of the rotor core is in heat-transferable contact with the rotor shaft,
        the rotor shaft is shaped as a cylinder that includes therein a cooling medium flow space through which a liquid cooling medium flows, and an inner circumferential face thereof that faces the cooling medium flow space is a cooling inner circumferential face,
        a cooling medium supply member that supplies the cooling medium to the cooling medium flow space is provided disposed in the cooling medium flow space,
        the cooling medium supply member includes therein a cooling medium supply path that extends in a rotor axial direction, and includes a cooling medium supply hole that extends from the cooling medium supply path toward a rotor radial outer side,
        the cooling medium supply hole includes a supply opening portion that opens toward the cooling inner circumferential face within a region that overlaps with the rotor core in the rotor axial direction,
        the rotor shaft includes a cooling medium discharge hole that extends from the cooling medium flow space toward the rotor radial outer side, and
        the cooling medium discharge hole includes a discharge opening portion that opens toward the radial outer side, is provided farther outward in the rotor axial direction than the rotor except for the rotor shaft, opens toward the coil end portion, and is a spray hole that sprays the cooling medium toward the coil end portion.

2. The rotor for a rotating electric machine according to claim 1, wherein
    the inner circumferential face of the rotor core is in heat-transferable contact with an outer circumferential face of the rotor shaft over a whole axial area.

3. The rotor for a rotating electric machine according to claim 1, wherein
   a flange-like axial positioning portion is provided fixed to the rotor shaft, and positions the rotor core in an axial direction by contacting an end face of the end plate in the rotor axial direction,
   a radial groove is provided formed on at least one of the end plate and the axial positioning portion so as to extend in a rotor radial direction along faces of contact between the end plate and the axial positioning portion, and
   the radial groove is provided on a radial outer side of the discharge opening portion in communication with the discharge opening portion.

4. The rotor for a rotating electric machine according to claim 1, wherein
   the rotor shaft includes a groove portion that is formed extending in the rotor axial direction on an outer circumferential face thereof; and a flange-like axial positioning portion that is provided so as to position the rotor core in the axial direction, and formed with a cutout portion by cutting out a radial outer portion of the groove portion, wherein
   the discharge opening portion is provided in a bottom portion of the groove portion within the cutout portion.

5. The rotor for a rotating electric machine according to claim 4, wherein
   the cutout portion is formed such that a circumferential length thereof increases radially outward.

6. The rotor for a rotating electric machine according to claim 1, wherein
   a flange-like axial positioning portion is provided fixed to an outer circumferential face of the rotor shaft, and positions the rotor core in the axial direction by contacting the end face of the end plate in the rotor axial direction,
   the cooling medium discharge hole is configured including an axial groove that is formed on the outer circumferential face of the rotor shaft so as to extend in the rotor axial direction along faces of contact between an inner circumferential face of the axial positioning portion and the outer circumferential face of the rotor shaft, and
   the axial groove extends from the axial positioning portion to a rotor axial outer side, and an end portion of the axial groove on the rotor axial outer side is provided with the discharge opening portion.

7. The rotor for a rotating electric machine according to claim 1, wherein
   the rotor shaft includes a flange-like axial positioning portion that positions the rotor core in the axial direction, and
   the cooling medium discharge hole is provided in the axial positioning portion.

8. The rotor for a rotating electric machine according to claim 1, wherein
   the cooling medium flow space includes, at both end portions of the cooling medium flow space in the rotor axial direction, a cooling medium storage portion that expands outward in a rotor radial direction and can store the cooling medium, and
   the cooling medium discharge hole is formed so as to extend from the cooling medium storage portion toward the rotor radial outer side.

9. The rotor for a rotating electric machine according to claim 1, wherein
   the cooling medium flow space is defined by an end wall portion that faces a rotor axial center side, and is respectively provided at both the end portions of the cooling medium flow space in the rotor axial direction.

10. The rotor for a rotating electric machine according to claim 9,
    wherein the end wall portion is configured by a stepped portion of the inner circumferential face of the rotor shaft, the stepped portion formed such that a center side of the end wall portion in the rotor axial direction is farther outward in a radial direction than an outer side of the end wall portion in the rotor axial direction.

11. The rotor for a rotating electric machine according to claim 1, wherein
    the cooling medium supply member has a rotation speed difference with respect to the rotor shaft.

12. The rotor for a rotating electric machine according to claim 1, wherein
    the cooling medium supply member is a penetrating shaft that is disposed so as to pass through the cooling medium flow space.

13. The rotor for a rotating electric machine according to claim 1, wherein
    the supply opening portion is disposed at a center portion of the rotor core in the rotor axial direction.

14. The rotor for a rotating electric machine according to claim 1, wherein
    the supply opening portion is shifted upward along the rotor axial direction from a center portion of the rotor core in the rotor axial direction in accordance with an inclination angle of the rotor shaft with respect to a horizontal direction.

15. The rotor for a rotating electric machine according to claim 1, wherein
    the discharge opening portion opens within a region along a line that extends in a rotor radial direction that intersects with the coil end portion.

16. The rotor for a rotating electric machine according to claim 1, wherein the rotor shaft protrudes outside in the axial direction from the end plate, and the coil end portion protrudes outside in the axial direction from the end plate.

17. The rotor for a rotating electric machine according to claim 1, wherein
    the discharge opening portion is open outward in a radial direction from an outer circumferential face of the rotor shaft.

18. The rotor for a rotating electric machine according to claim 1, wherein
    an air gap is continuous in a radial direction between the discharge opening portion and the coil end portion.

19. The rotor for a rotating electric machine according to claim 1, wherein
    the end plate is disposed further outward in radial and axial directions than the permanent magnet.

20. A rotor for a rotating electric machine comprising:
    a cylindrical rotor core; and
    a rotor shaft fixed so as to rotate together with the rotor core, wherein
    an inner circumferential face of the rotor core is in heat-transferable contact with the rotor shaft,
    the rotor shaft is shaped as a cylinder that includes therein a cooling medium flow space through which a cooling medium flows, and an inner circumferential face thereof that faces the cooling medium flow space is a cooling inner circumferential face,
    a cooling medium supply member that supplies the cooling medium to the cooling medium flow space is provided disposed in the cooling medium flow space,
    the cooling medium supply member includes therein a cooling medium supply path that extends in a rotor axial direction, and includes a cooling medium supply hole that extends from the cooling medium supply path toward a rotor radial outer side, the cooling medium supply hole includes a supply opening portion that opens toward the cooling inner circumferential face within a region that overlaps with the rotor core in the rotor axial direction, the rotor shaft includes a cooling medium discharge hole that extends from the cooling medium flow space toward the rotor radial outer side, the cooling medium discharge hole includes a discharge opening portion that is more toward a rotor axial outer side than an axial end face of the rotor core and opens toward the radial outer side, the rotor shaft includes a groove portion that is formed extending in the rotor axial direction on an outer circumferential face thereof; and a flange-like axial positioning portion that is provided so as to position the rotor core in the axial direction, and formed with a cutout portion by cutting out a radial outer portion of the groove portion, and the discharge opening portion is provided in a bottom portion of the groove portion within the cutout portion.

21. A rotor for a rotating electric machine comprising:

a cylindrical rotor core; and a rotor shaft fixed so as to rotate together with the rotor core, wherein an inner circumferential face of the rotor core is in heat-transferable contact with the rotor shaft, the rotor shaft is shaped as a cylinder that includes therein a cooling medium flow space through which a cooling medium flows, and an inner circumferential face thereof that faces the cooling medium flow space is a cooling inner circumferential face, a cooling medium supply member that supplies the cooling medium to the cooling medium flow space is provided disposed in the cooling medium flow space, the cooling medium supply member includes therein a cooling medium supply path that extends in a rotor axial direction, and includes a cooling medium supply hole that extends from the cooling medium supply path toward a rotor radial outer side, the cooling medium supply hole includes a supply opening portion that opens toward the cooling inner circumferential face within a region that overlaps with the rotor core in the rotor axial direction, the rotor shaft includes a cooling medium discharge hole that extends from the cooling medium flow space toward the rotor radial outer side, the cooling medium discharge hole includes a discharge opening portion that is more toward a rotor axial outer side than an axial end face of the rotor core and opens toward the radial outer side, the rotor core includes a rotor core body, and an end plate that is mounted to the axial end face of the rotor core body, a flange-like axial positioning portion is provided fixed to an outer circumferential face of the rotor shaft, and positions the rotor core in the axial direction by contacting the end face of the end plate in the rotor axial direction, the cooling medium discharge hole is configured including an axial groove that is formed on the outer circumferential face of the rotor shaft so as to extend in the rotor axial direction along faces of contact between an inner circumferential face of the axial positioning portion and the outer circumferential face of the rotor shaft, and the axial groove extends from the axial positioning portion to the rotor axial outer side, and an end portion of the axial groove on the rotor axial outer side is provided with the discharge opening portion.

* * * * *